US010517012B2

United States Patent
Gundavelli et al.

(10) Patent No.: US 10,517,012 B2
(45) Date of Patent: Dec. 24, 2019

(54) METHODS AND APPARATUS FOR USE IN ADAPTIVELY REROUTING USER PLANE TRAFFIC FOR MOBILITY USING SEGMENT ROUTING FOR IPV6

(71) Applicant: Cisco Technology, Inc., San Jose, CA (US)

(72) Inventors: Srinath Gundavelli, San Jose, CA (US); Ravi Kiran Guntupalli, Cumming, GA (US); Aeneas Sean Dodd-Noble, Andover, MA (US); Kirk McBean, North Wales, PA (US)

(73) Assignee: Cisco Technology, Inc., San Jose, CA (US)

( * ) Notice: Subject to any disclaimer, the term of this patent is extended or adjusted under 35 U.S.C. 154(b) by 5 days.

(21) Appl. No.: 15/872,823

(22) Filed: Jan. 16, 2018

(65) Prior Publication Data

US 2019/0223047 A1 Jul. 18, 2019

(51) Int. Cl.
*H04W 28/02* (2009.01)
*H04L 12/749* (2013.01)
(Continued)

(52) U.S. Cl.
CPC ......... *H04W 28/0247* (2013.01); *H04L 45/34* (2013.01); *H04L 45/507* (2013.01); *H04W 36/0016* (2013.01); *H04W 36/12* (2013.01); *H04W 36/32* (2013.01); *H04W 40/36* (2013.01); *H04L 45/64* (2013.01); *H04L 45/741* (2013.01);
(Continued)

(58) Field of Classification Search
None
See application file for complete search history.

(56) References Cited

U.S. PATENT DOCUMENTS 8,995,390 B1* 3/2015 Zhao ............... H04W 8/085
370/331
10,182,091 B2* 1/2019 Azgin ............. H04L 65/1073
(Continued)

FOREIGN PATENT DOCUMENTS

WO 2017181408 A1 10/2017

OTHER PUBLICATIONS

Chan et al., "Distributed Mobility Anchoring, draft-ietf-dmm-distributed-mobility-achoring-03", DMM, Internet-Draft Dec. 14, 2016, pp. 1-51.
(Continued)

*Primary Examiner* — Candal Elpenord

(57) ABSTRACT

A control plane (CP) entity is to adaptively reroute user plane traffic of a mobile node (MN) with use of a segment routing (SR) for IPv6. A message indicating an attachment of the MN to the mobile network is received selecting a first user plane (UP) anchor node. A first set of home network prefixes (HNPs) are allocated to the MN. An IP traffic flow using a first HNP prefix is established between the MN and a correspondent node (CN) along a first network path—defined at least in part by the first UP anchor node and an anchor node of the CN. In response to a handover of the MN, a message indicating a subsequent attachment of the MN is received selecting a second UP anchor node. The second UP anchor node is instructed to host the first HNP prefix previously allocated by the first UP anchor node.

20 Claims, 25 Drawing Sheets

(51) Int. Cl.

| | | |
|---|---|---|
| *H04L 12/715* | (2013.01) | |
| *H04W 28/12* | (2009.01) | |
| *H04W 36/00* | (2009.01) | |
| *H04W 36/12* | (2009.01) | |
| *H04W 36/32* | (2009.01) | |
| *H04W 40/36* | (2009.01) | |
| *H04L 12/721* | (2013.01) | |
| *H04L 12/723* | (2013.01) | |
| *H04L 29/12* | (2006.01) | |
| *H04W 8/08* | (2009.01) | |
| *H04W 24/02* | (2009.01) | |
| *H04W 40/24* | (2009.01) | |
| *H04W 88/16* | (2009.01) | |

(52) U.S. Cl.
CPC ...... *H04L 61/2007* (2013.01); *H04L 61/6059* (2013.01); *H04W 8/085* (2013.01); *H04W 24/02* (2013.01); *H04W 28/0226* (2013.01); *H04W 28/12* (2013.01); *H04W 40/24* (2013.01); *H04W 88/16* (2013.01)

(56) References Cited

U.S. PATENT DOCUMENTS

| | | | | |
|---|---|---|---|---|
| 10,367,721 | B2* | 7/2019 | Faccin | H04L 45/22 |
| 2010/0027509 | A1 | 2/2010 | Velev et al. | |
| 2011/0103340 | A1* | 5/2011 | Zhu | H04W 36/0011 |
| | | | | 370/329 |
| 2011/0122839 | A1* | 5/2011 | Rexhepi | H04W 36/12 |
| | | | | 370/331 |
| 2014/0177597 | A1 | 6/2014 | Perras et al. | |
| 2016/0150448 | A1* | 5/2016 | Perras | H04W 36/12 |
| | | | | 455/450 |
| 2017/0230877 | A1* | 8/2017 | Claassen | H04W 36/0016 |

OTHER PUBLICATIONS

Previdi et al., "IPv6 Segment Routing Header (SRH), draft-ietf-6man-segment-routing-header-07", Networking Working Group Internet-Draft, Jul. 20, 2017, pp. 1-34.

Filsfils et al., "Segment Routing Architecture, draft-ietf-spring-segment-routing-14", Networking Working Group Internet-Draft. Dec. 20, 2017, pp. 1-31.

Ginsberg et al., "IS-IS Extensions to Support Routing over IPv6 Dataplane, draft-bashandy-isis-srv6,extensions-01.txt", Networking Working Group Internet-Draft, Sep. 29, 2017, pp. 1-19.

Matsushima et al., "Segment Routing IPv6 for Mobile User-Plane, draft-matsushima-dmm,srv6-mobile-uplane-03", Spring and DMM Internet-Draft, Nov. 12, 2017, pp. 1-20.

Filsfils et al., "SRv6 Network Programming, draft-filsfils-spring-srv6-network-programming-03", Spring Internet-Draft, Dec. 21, 2017, pp. 1-50.

International Search Report and Written Opinion in counterpart International Application No. PCT/US2019/012826, dated Mar. 14, 2019, 14 pages.

Tien-Thinh, et al., "SDN-Based Distributed Mobility Management for 5G Networks", IEEE Wireless Communications and Networking Conference (WCNC 2016)—Track 3—Mobile and Wireless Networks, Apr. 3-6, 2016, Doha, Qatar, 7 pages.

S. Matsushima, et al., "Segment Routing IPv6 for Mobile User-Plane", draft-matsushima-spring-dmm-srv6-mobile-uplane-03, SPRING and DMM, Internet-Draft, Nov. 12, 2017, 20 pages.

* cited by examiner

502

| Flow Destination | Flow Anchor | Traffic Flow Path | MC / TC to AG policy Rule |
|---|---|---|---|
| CN-1 | AG-2 | MN-1: AG-2: R2: AG-4: CN1 | @AG2: Default |
| CN-2 | AG-2 | MN-1: AG-2: R3: CN2 | |
| ALL | AG-2 | MN-1: AG-2: * | |

| Flow Direction | MN-Anchor (AG-6) (SRv6 Functions) | CN Anchor (AG-4) (SRv6 Functions) |
|---|---|---|
| MN to CN | T.Insert (Transit with insertion of SRv6 policy) | End.X (Or, End.B6, instantiation of a binding SID); Or, End.T for internet traffic |
| CN to MN | End.X (Layer-3 Cross Connect) (Or, End.B6, instantiation of a binding SID) | T.Insert (Transit with insertion of SRv6 policy) |

| Flow Destination | Flow Anchor | Traffic Flow Path | MC / TC to AG Routing Rule |
|---|---|---|---|
| CN-1 | AG-6 | MN-1: AG-6 AG-4: CN1 | @AG4: For P1, steer to AG6 |
| CN-2 | AG-6 | MN-1: AG-6 R3: CN2 | @R3: For P1, steer to AG6 |
| ALL (Old) | AG-6 | MN-1: AG-6: AG-2: * | @AG2: For P1, steer to AG6 |
| ALL (New) | AG-6 | MN-1: AG-6: * | |

METHODS AND APPARATUS FOR USE IN ADAPTIVELY REROUTING USER PLANE TRAFFIC FOR MOBILITY USING SEGMENT ROUTING FOR IPV6

TECHNICAL FIELD

The present disclosure relates generally to routing user plane traffic for mobile nodes operating in mobile networks, and more specifically to adaptively rerouting user plane traffic to accommodate mobility with use of a segment routing (SR) for IPv6 (SRv6) protocol.

BACKGROUND

There is a need to provide for increased efficiency and optimization in the routing of user plane traffic in a mobile network to accommodate for mobility.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIG. 5A is a table of information regarding the network paths shown in FIG. 4C, FIG. 5B is a table of example functions for the SRv6 rerouting of the network paths after a handover of the MN described in relation to FIG. 4D, and FIG. 5C is a table of information regarding the optimized network paths shown in FIG. 4E;

DESCRIPTION OF EXAMPLE EMBODIMENTS

Figure 1A:
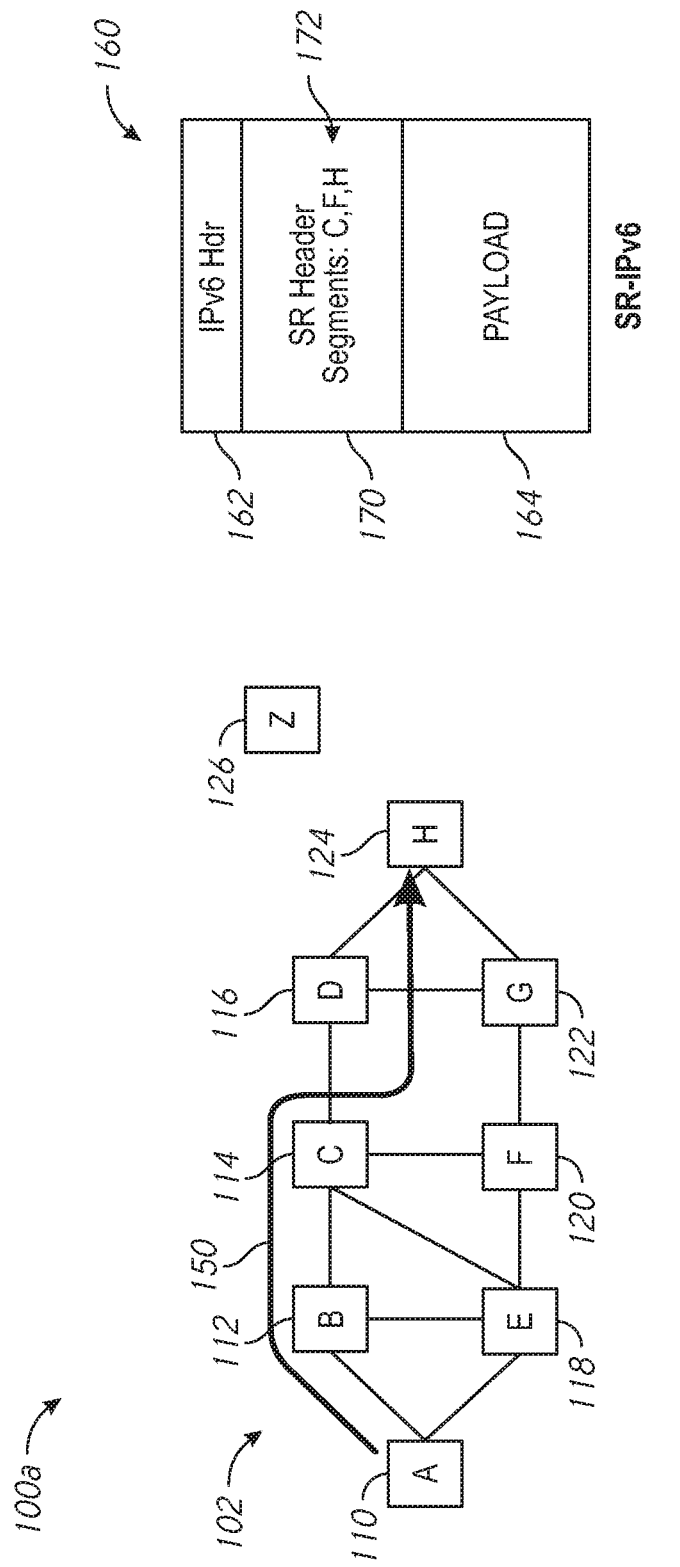
FIGS. 1A-1D are illustrative block diagrams of communication networks operative to route IP traffic flows with use of a segment routing (SR) for IPv6 (SRv6) protocol.

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

Overview

Methods and apparatus for use in adaptively rerouting user plane traffic for mobility using a segment routing (SR) for IPv6 (SRv6) protocol are described herein. Advantageously, a mobility-aware, floating anchor (MFA) may be provided in a mobile network.

In some implementations, a technique of the present disclosure may be performed at one or more controllers of a control plane (CP) entity for a mobile network. In an illustrative example, a message indicating an attachment of a mobile node (MN) to the mobile network is received, where a first user plane (UP) anchor node (e.g. a GW-U) is selected for the MN. A first set of home network prefixes (HNPs) and a first set of local network prefixes (LNPs) are allocated to the MN. An IP traffic flow to and/or from a first HNP prefix of the MN is established between the MN and a correspondent node (CN) along a first network path. The first network path may be selected with use of a destination-based routing protocol, and defined by a first plurality of nodes which include the first UP anchor node of the MN and an anchor node of the CN.

In response to a handover of the MN in the mobile network, a message indicating a subsequent attachment of the MN to the mobile network is received, where a second UP anchor node is selected for the MN. The second UP anchor node is instructed to host the first HNP prefix previously allocated by the first UP anchor node. Further, at least one of the first UP anchor node, the second UP anchor node, and the anchor node of the CN may be subsequently provisioned with one or more rules, for instruction to perform SRv6 routing or rerouting of an IP traffic flow to and/or from the first HNP prefix of the relocated MN, to optimize such IP traffic flow. At least some of such provisioning may be performed in response to anchor node reports of IP traffic flow to and/or from the first HNP prefix.

As one example, the anchor node of the CN may be provisioned with one or more rules, for instructing the anchor node to perform SRv6 routing of a downlink IP traffic flow from the CN to the (relocated) MN along a second network path defined by a second plurality of nodes. The second plurality of nodes include the second UP anchor node and exclude the first UP anchor node, for optimizing the IP traffic flow.

Note that, at some time with the new, second UP anchor node, a second set of HNPs may be allocated to the MN, where new network paths for newly-established IP traffic flows to and/or from a second HNP prefix of the MN may be selected based on the destination-based routing protocol.

Example Embodiments

FIGS. 1A-1D are illustrative block diagrams of communication networks operative to route IP traffic flows with use of a segment routing (SR) for IPv6 (SRv6) protocol. In general, SRv6 is a source-based routing protocol which is different from a destination-based routing protocol. The following description in relation to FIGS. 1A-1D illustrates a few basic concepts of SRv6.

With reference to FIG. 1A, a communication network 100a which includes a plurality of nodes 102 (e.g. routers, servers, gateways, etc.) is shown. In this example, the plurality of nodes 102 includes nodes 110, 112, 114, 116, 118, 120, 122, 124, and 126 which are designated as nodes A, B, C, D, E, F, G, H, and Z, respectively. Here, node 110 (i.e. node A) is considered to be a source node and node 126 (i.e. node Z) is considered to be a destination node. Nodes 112, 114, 116, 118, 120, 122, and 126 which correspond to nodes B, C, D, E, F, and G are part of an SR domain (i.e. nodes that are SRv6-capable nodes/SRv6-configured nodes). The source node (node 110 or A) and the destination node (node 126 or Z) are not part of or outside of the SR domain (e.g. they may or may not be SRv6-configured nodes, such as "regular" IPv6 nodes).

A basic data format of an SR-IPv6 packet 160 for use in SRv6 routing is also shown in FIG. 1A. As illustrated, the data format of SR-IPv6 packet 160 includes an IPv6 header 162 and a payload 164. For SRv6 routing of IPv6 packet 160, the data format of IPv6 packet 160 further includes an SR header 170 or "SRH" (i.e. an extension header for SR as defined by RFC 2460). SR header 170 may include an ordered list of segments 172 which defines a network path 150 along which the SR-IPv6 packet 160 will be communicated in communication network 100a. In the example of FIG. 1A, the ordered list of segments 172 includes node 114 ("node C"), node 120 ("node F"), and node 124 ("node H") in network path 150. A segment is or includes an instruction (e.g. forwarding, servicing, application-specific, etc.) to be applied to the SR-IPv6 packet 160.

Thus, an SR-IPv6 packet (e.g. SR-IPv6 packet 160) may be communicated in communication network 100a from a source node (e.g. node 110 or A) to a destination node (e.g. a node 126 or Z) along a desired or predetermined network path 150. The source node (e.g. node 110 or A) may operate to choose this network path 150 and encode it in the SR header 170 as the ordered list of segments 172. The rest of communication network 100a may operate to execute the encoded instructions without any further per-flow state.

Figure 1B:
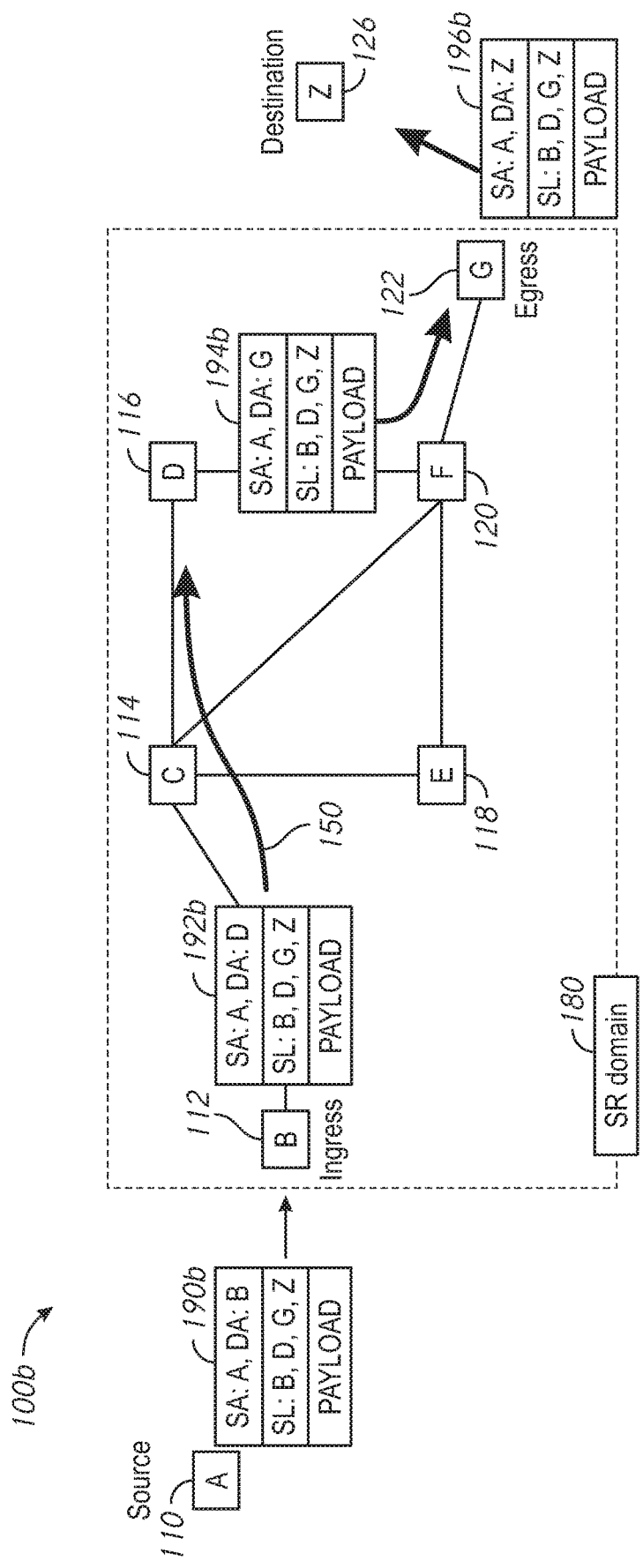

FIG. 1B is an illustrative representation of a communication network 100b which is similar to communication network 100a of FIG. 1A. In FIG. 1B, nodes 112, 114, 116, 118, 120, 122, and 126 which correspond to nodes B, C, D, E, F, and G are shown to be part of an SR domain 180. The source node (node 110 or A) and the destination node (node 126 or Z) are not part of or outside of the SR domain 180 (e.g. they may or may not be SRv6-configured nodes). In the example of FIG. 1B, node 112 or B may be considered as an ingress node of the SR domain 180 and node 122 or G may be considered as an egress node of the SR domain 180.

Note that an SR header may be inserted in an IPv6 packet at a source node or at an ingress node, or even encapsulated at the ingress node, as a few examples. In the example shown in FIG. 1B, an SR header of an IPv6 packet is inserted at the source node (node 110 or A) to produce an SR-IPv6 packet 190b. In this case, the source node (node 110 or A) which is SRv6-capable may originate the SR-IPv6 packet 190b. Here, the SR header of SR-IPv6 packet 190b includes an ordered list of segments (SL) designating nodes B, D, G, and Z to define network path 150. Initially, a source address (SA) of SR-IPv6 packet 190b is designated as node A and a destination address (DA) of SR-IPv6 packet 190b is designated as node B (i.e. the first node in the SL). When SR-IPv6 packet 190b is communicated to the ingress node (i.e. node 112 or B), the DA is modified by the ingress node to include the next or second node in the SL (i.e. node D), as indicated in SR-IPv6 packet 192b. When SR-IPv6 packet 192b is communicated to the node D (via node C), the DA is modified by node D to include the next or third node in the SL (i.e. node G), as indicated in SR-IPv6 packet 194b. When SR-IPv6 packet 194b is further communicated to the node G (via node F), the DA is modified by node G to include the next or fourth node in the SL (i.e. node Z which is the destination node), as indicated in SR-IPv6 packet 196b.

Figure 1C:
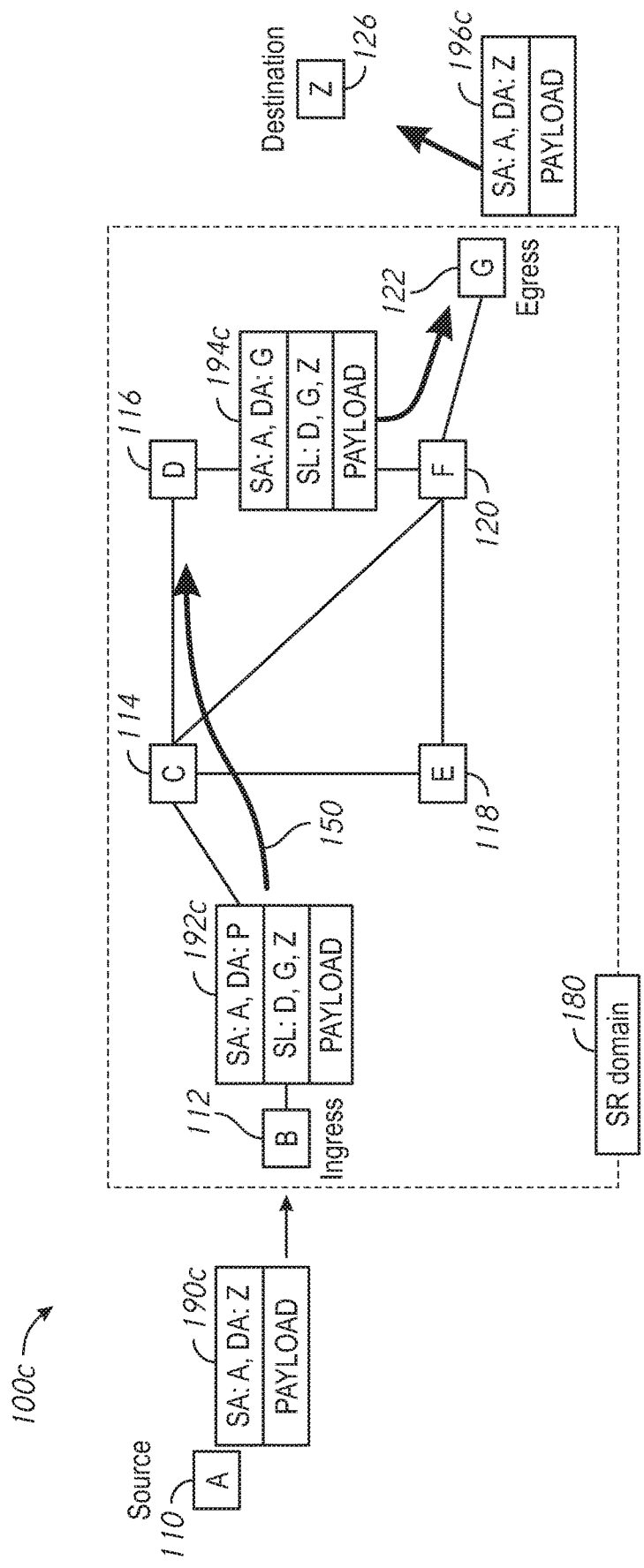

In the example of FIG. 1C, an SR header of an IPv6 packet 190c is inserted at the ingress node (node 112 or B) to produce an SR-IPv6 packet 192c. Here, the SR header of SR-IPv6 packet 192c includes an ordered list of segments (SL) designating nodes D, G, and Z to define network path 150. In this case, the source node, which may or may not be SRv6-configured, may originate the IPv6 packet 190c without any SR header. When SR-IPv6 packet 192c is communicated to node D (via node C), the DA is modified by node D to include the next or second node in the SL (i.e. node G), as indicated in SR-IPv6 packet 194c. When SR-IPv6 packet 194c is further communicated to the node G (via node F), the DA is modified by node G to include the next or third node in the SL (i.e. node Z, which is the destination node) and the SR header is removed, as indicated in IPv6 packet 196c. Here, similar to the source node, the destination node may or may not be SRv6-configured.

Figure 1D:
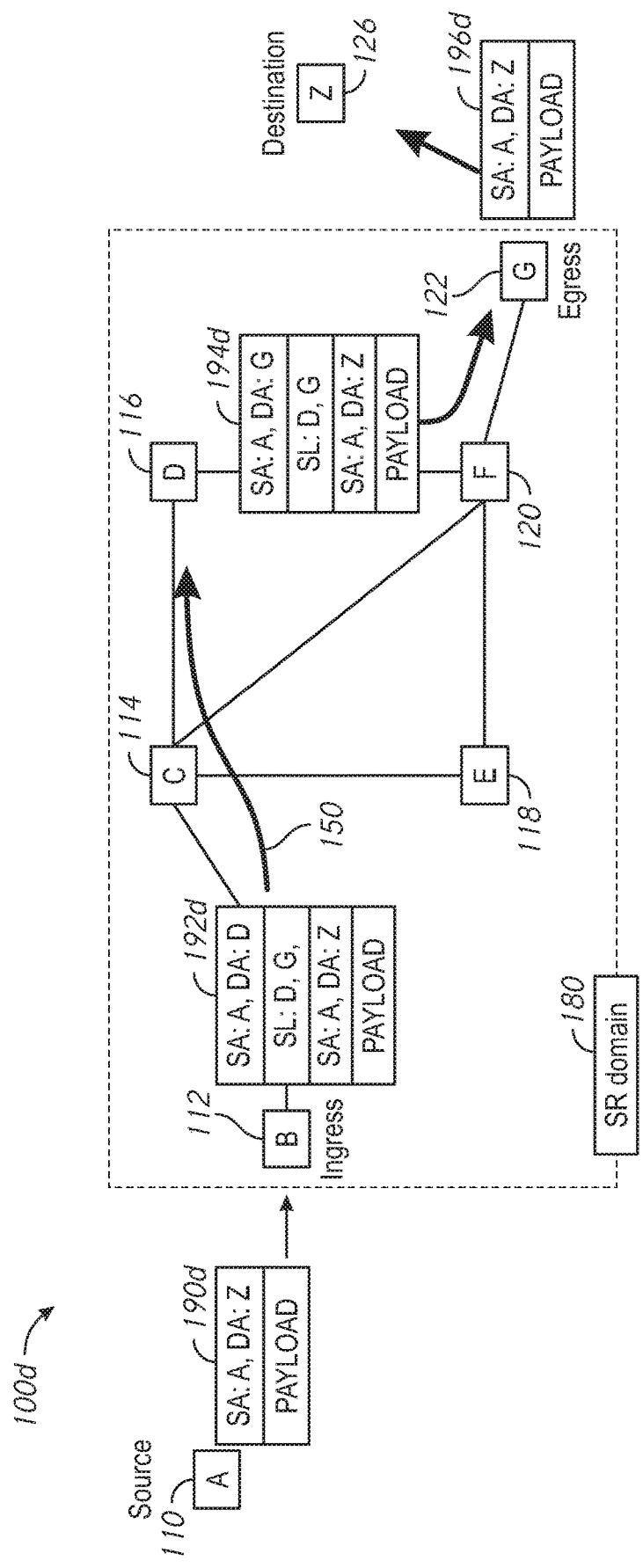

In the example of FIG. 1D, the source node, which may or may not be SRv6-configured, originates an IPv6 packet 190d without any SR header. The ingress node (node 112 or B) operates to encapsulate IPv6 packet 190d with a new, outer IPv6 header followed by an SR header, to produce an SR-IPv6 packet 192d. The SL of the SR header includes nodes D and G, but does not include the destination node (node 126 or Z). When SR-IPv6 packet 192d is communicated to node D (via node C), the DA is modified by node D to include the next or second node in the SL (i.e. node G), as indicated in SR-IPv6 packet 194d. When SR-IPv6 packet 194d is further communicated to the node G (via node F), the SR-IPv6 packet 194d is decapsulated by node G, which is represented by SR-IPv6 packet 196d. Here, similar to the source node, the destination node may or may not be SRv6-configured.

As one ordinarily skilled in the art would readily appreciate, the current state of the art for SRv6 is further described in various standards-related documents, including Internet Engineering Task Force (IETF) documents, such as "*Segment Routing Architecture*" identified by "draft-ietf-spring-segment-routing-14"; "IPv6 *Segment Routing Header (SRH)*" identified by "draft-ietf-6man-segment-routing-header-07"; and "*SRv6 Network Programming*" identified by "draft-filsfils-spring-srv6-network-programming-03".

Advantageously, methods and apparatus of the present disclosure leverage the current state of the art of SRv6, for use in the adaptive rerouting of user plane traffic for mobile nodes (MN) in a mobile network. The methods and apparatus of the present disclosure may be implemented in any suitable type of mobile network. The mobile network may be, for example, 4G Long Term Evolution (LTE)-based mobile network or a 5G mobile network.

Figure 2A:
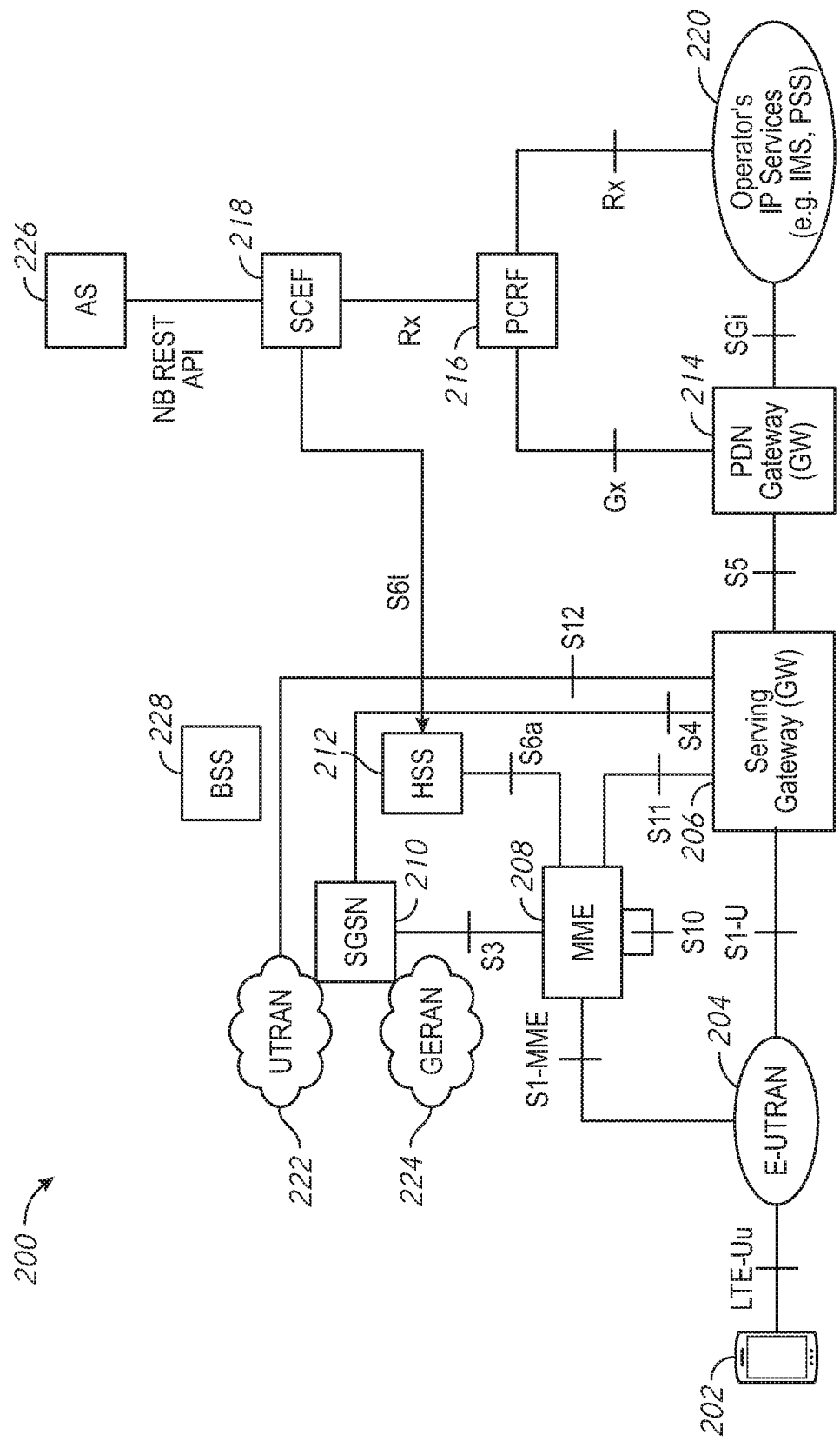
FIGS. 2A-2B show a basic network architecture of a 4G, Long Term Evolution (LTE) based mobile network in which techniques and components of the present disclosure may be provided.

Reference is now made to FIG. 2A, which shows a network architecture 200 of a 4G, LTE-based mobile network in which techniques and components of the present disclosure may be implemented. The mobile network of FIG. 2A may be configured with a control plane (CP) and user plane (UP) separation architecture which is described later in relation to FIG. 2B.

Network architecture 200 of the 4G, LTE-based network of FIG. 2A includes a mobility management entity (MME) 208, a serving GPRS support node (SGSN) 210, a home subscriber server (HSS) 212, a service capability exposure function (SCEF) 218, a policy and charging rules function (PCRF) 216, a serving gateway (GW) 206 or S-GW, and a packet data network (PDN) gateway 214 or PGW. A business support system (BSS) 228 may also be connected to the network. A plurality of interfaces shown in network architecture 20 of FIG. 2A (e.g. LTE-Uu, S1-U, S1-MME, S3, S4, S5, S6a, S10, S11, S12, Gx, Rx, SGi, S6t, and an NB REpresentational State Transfer (REST) Application Programming Interface (API)) may define the communications and/or protocols between each of the entities, as described in the relevant standards documents for LTE. An operator may provide an IP service network 220 with connection to the network via PCRF 216 and PDN gateway 214. The IP service network 220 may provide various IP services, such as IP multimedia subsystem (IMS), packet switched stream (PSS), etc. An application server (AS) 226 may connect to the mobile network via SCEF 218.

A user equipment (UE) 202 (one type of a mobile node or MN) may obtain access to the mobile network via a Universal Terrestrial Radio Access Network (eUTRAN) which may include one or more base stations (eNodeBs or eNBs) and one or more radio network controllers (RNCs). In the present disclosure, a UE 202 operating in the LTE-based mobile network may be any suitable type of device, such as a cellular telephone, a smart phone, a tablet device, a laptop computer, an Internet of Things (IoT) device, and a machine-to-machine (M2M) communication device, to name but a few. For additional network access for UEs, one or more additional UTRANs 222 and one or more GSM edge radio access networks (GERAN) 224 may be connected in the network.

Figure 2B:
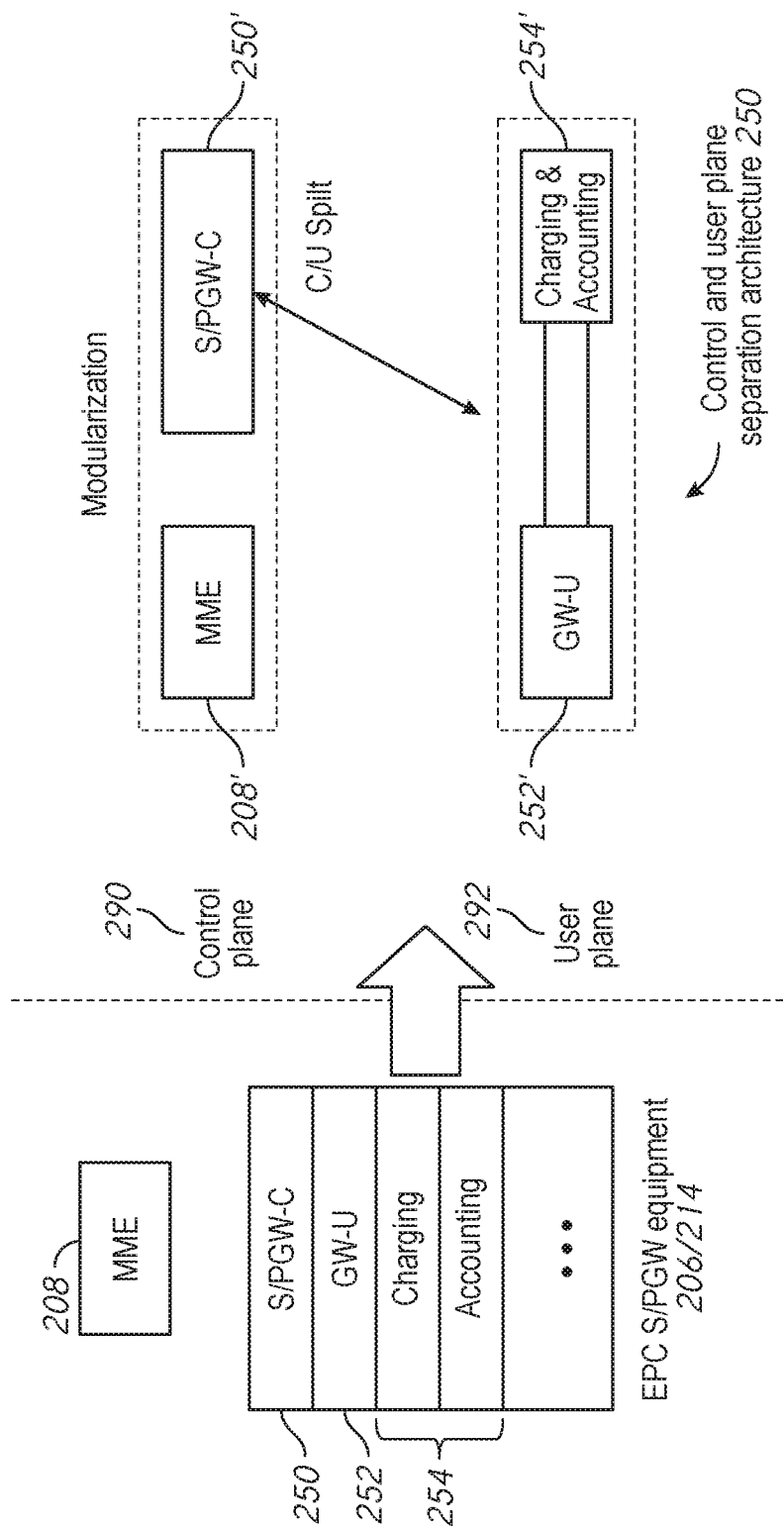

In some implementations of the present disclosure, the techniques are embodied in one or more components of the mobile network configured with control plane (CP) and user plane (UP) separation. An architecture 250 for separation of a control plane (CP) 290 and a user plane (UP) 292 is conceptually illustrated in FIG. 2B. The left side of FIG. 2B illustrates equipment and/or entities of the architecture without the CP and UP separation, showing MME 208 and S/PGW equipment 206/214 including a S/PGW-C 250 (i.e. as part of the CP), a GW-U 252 (i.e. as part of the UP), and service point functionality 254 for charging and accounting (and perhaps other services, such as lawful intercept). The right side of FIG. 2B illustrates equipment and/or entities of the architecture 250 with the separation and modularization of the CP 290 and the UP 292 (a C/U "split"), showing MME 208' and S/PGW 250' (the CP 290) being separated from GW-U 252' and its service point functionality 254' (the UP 292).

Note that some techniques of the present disclosure may be implemented in one or more controllers of the CP entity of a mobile network. Accordingly, in a 4G LTE-based mobile network, the techniques may be implemented in a mobility management entity (MME) and/or a gateway control plane (GW-C) of the mobile network, where the UP entities may be (or be part of) gateway user planes (GW-U) which serve as service points for accounting and charging. In a 5G mobile network, the techniques may be implemented in an access and mobility management function (AMF) and/or a session management function (SMF), where the UP entities may be user plane functions (UPFs) which serve as the service points for accounting and charging.

Figure 4A:
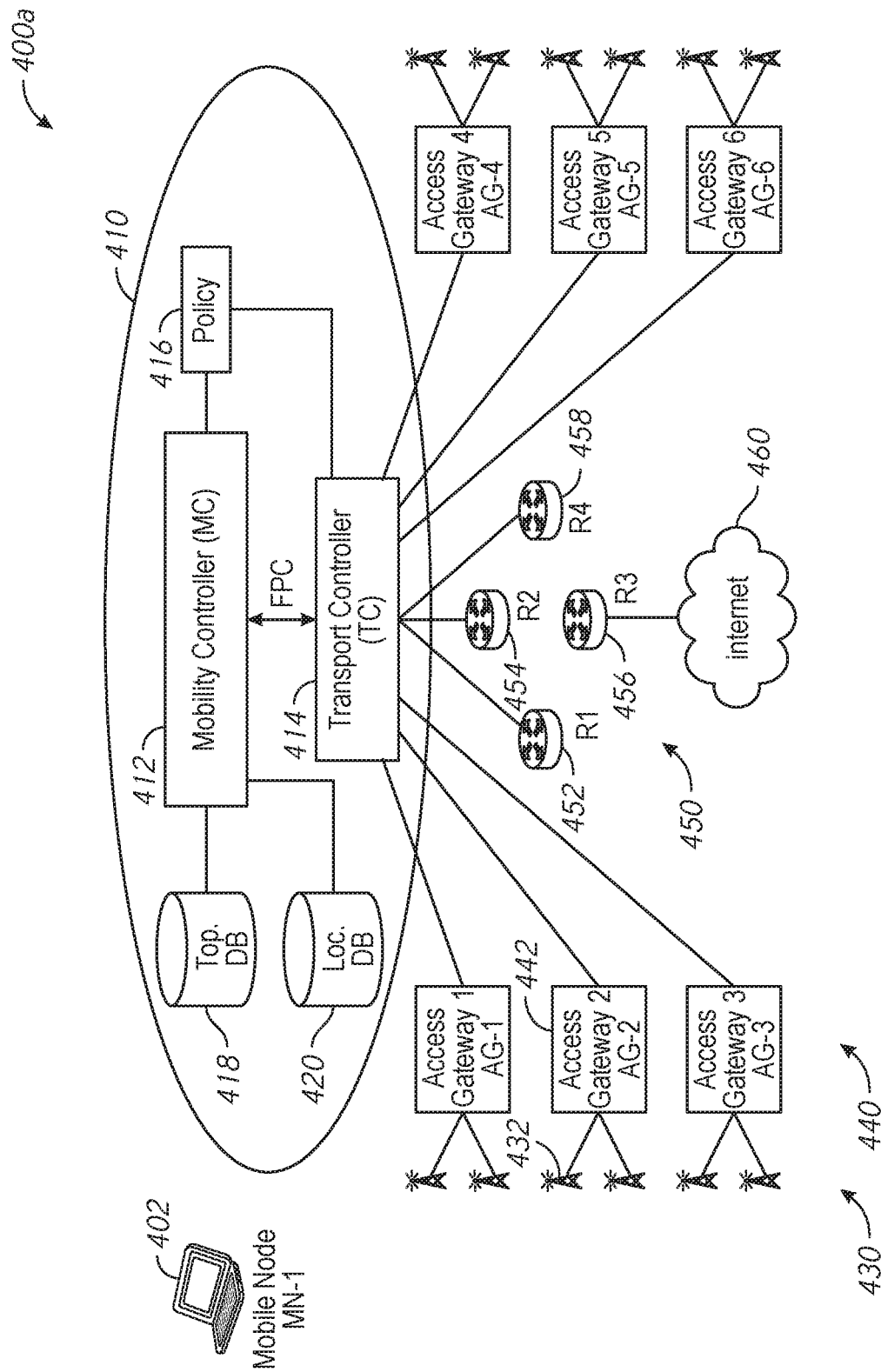
FIG. 4A is a more general representation of a mobile network according to some implementations of the present disclosure, with FIGS. 4B-4E illustrating the adaptive rerouting of user plane traffic of an MN in the mobile network.

Referring ahead now to FIG. 4A, what is shown is a more general illustrative representation 400a of a mobile network, according to some implementations of the present disclosure. A mobile node (MN), such as an MN-1 402, may access a core network (CN) of the mobile network via a radio access network (RAN). The RAN includes a plurality of base stations 430 (e.g. eNodeBs, eNodeGs, access points or APs etc.). Each one of a plurality of access gateways (AGs) 440 may be associated with one or more of the base stations 430. AGs 440 may be anchor nodes for MNs and provide UP functions for UP traffic of the MNs. The CN of the mobile network includes a plurality of routers 450, sometimes referred to as transit routers, which may be used to route such UP traffic. In FIG. 4A, routers 450 are shown to include routers 452, 454, 456, and 458, designated as routers R1, R2, R3, and R4, respectively.

The mobile network 400a also includes a mobility controller (MC) 412 and a transport controller (TC) 414. MC 412/TC 414 are configured to perform conventional CP functions, as well as to perform the adaptive rerouting techniques of the present disclosure. For this purpose, MC 412 and/or TC 414 maintain access to a policy database (DB) 416, a network topology DB 418, and a mobile node location table 420. Policy DB 416 is for storing policy or routing rules information associated with routing or SRv6. Network topology DB 418 is for storing network topology information which characterizes a network topology of the mobile network. Mobile node location table 420 is for storing associations between MNs and their assigned/allocated IP addresses, and between MNs and their assigned anchor nodes. Such information, as well as the use thereof, will become more clear in relation to the flowcharts and call flows provided in the remaining figures.

Figure 10:
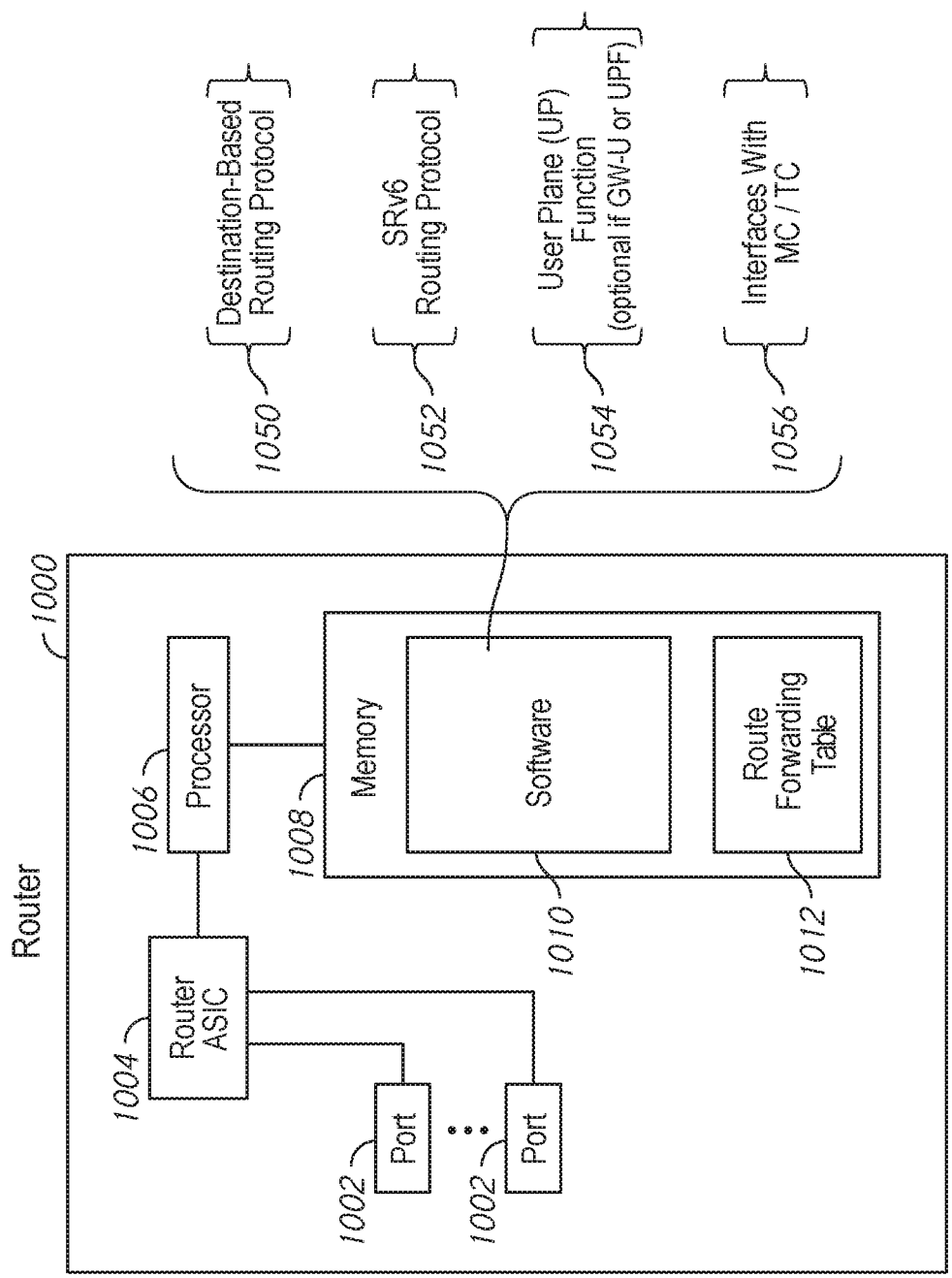
FIG. 10 is an example block diagram of a router or routing device configured with the functions according to some implementations of the present disclosure.

Each one of routers 450 or AGs 440 may be equipped with plurality of software functions or modules, including one or more destination-based routing protocols, an SRv6 routing protocol with network programming features, and one or more interfaces with for programmability with the MC/TC (see e.g. the description in relation to FIG. 10 provided later below). The one or more destination-based routing protocols may include one or more of Internet Group Management Protocol (IGMP), Intermediate System to Intermediate System (IS-IS), Open Shortest Path First (OSPF), Routing Information Protocol (RIP), or the like. If the device is a gateway or the like (access gateway or GW-U), it may further include user plane (UP) functionality for user plane traffic.

Today's mobile routing practice typically involves fixed anchoring techniques and/or extensive tunneling from the user plane to accommodate mobility. Accordingly, there is a need to provide for increased efficiency and optimization in the routing of user plane traffic in a mobile network to accommodate for mobility.

Referring now to FIGS. 3A-3D, what are provided are flowcharts for describing methods of adaptively rerouting user plane traffic for MNs with use of SRv6, according to some implementations of the present disclosure. More detailed techniques are described later in relation to the call flows in FIGS. 6A-6B, 7A-7B, and 8A-8B. The methods of FIGS. 3A-3D may be performed by one or more controllers (e.g. an MC 412 and/or TC 414) of a CP entity in a mobile network. The methods may also be embodied as a computer program product including a non-transitory computer readable medium and instructions stored in the non-transitory computer readable medium, where the instructions are executable on one or more processors or performing the steps of the method.

The flowcharts of FIGS. 3A-3D will now be described with reference to their associated mobile network illustrations in FIGS. 4A-4E. Description of the flowcharts of FIGS. 3A-3D will now begin with the flowchart 300a of FIG. 3A.

Figure 3A:
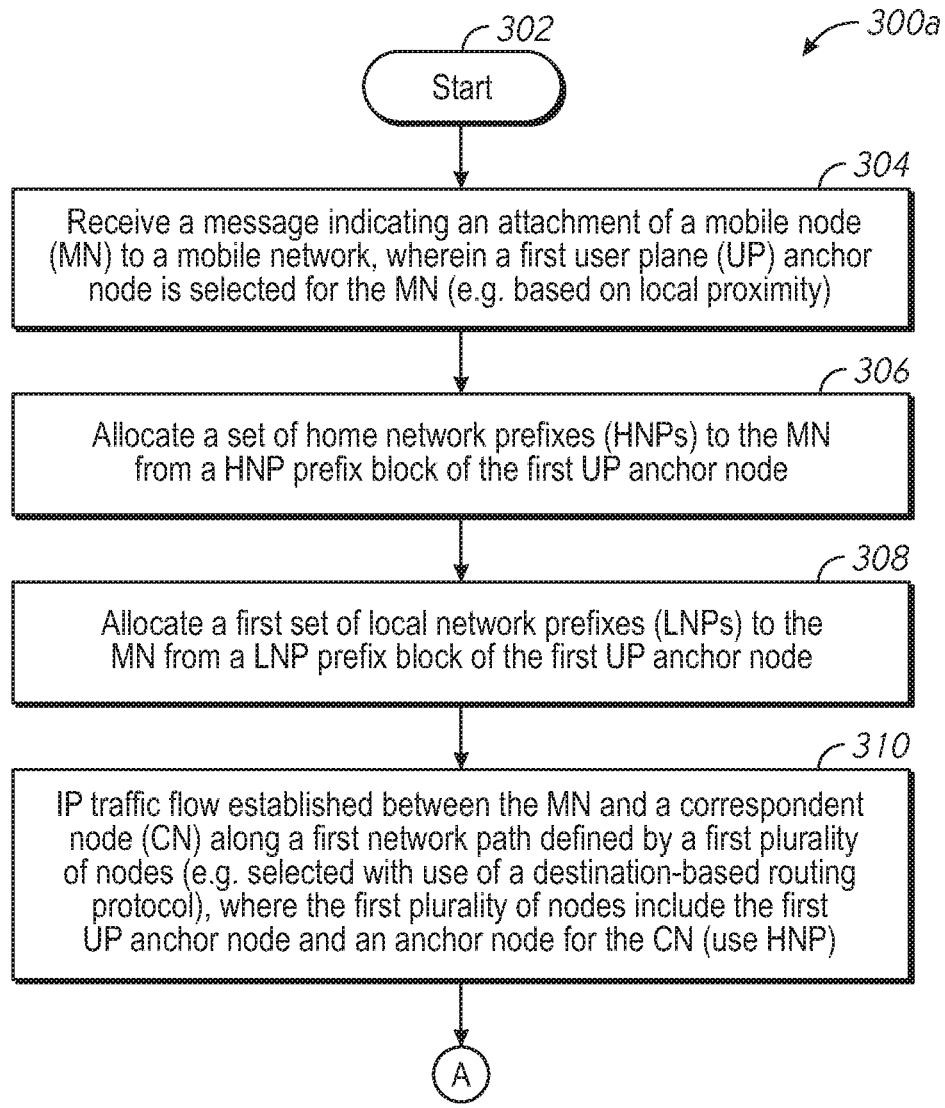
FIGS. 3A-3D are flowcharts for describing methods for use in adaptively rerouting user plane traffic for mobile nodes (MNs) with use of SRv6.

Beginning at a start block 302 of FIG. 3A, a message indicating an attachment of a MN to a mobile network is received, where a first user plane (UP) anchor node is selected for the MN (step 304 of FIG. 3A). The first UP anchor node may be selected for the MN based on its local proximity to the MN (e.g. the closest UP anchor node). Next, a set of home network prefixes (HNPs) is allocated to the MN, selected from a HNP prefix block of the first UP anchor node (step 306 of FIG. 3A). Note that this allocated set of HNPs is topologically anchored at the first UP anchor node; however, the assigned HNP will remain as a stable prefix for the MN to accommodate mobility. A first set of local network prefixes (LNPs) is also allocated to the MN, selected from a first LNP prefix block of the first UP anchor node (step 308 of FIG. 3A). Note that, in contrast to the allocated set of HNPs, the allocated first set of LNPs, topologically anchored at the first UP anchor node, will not provide mobility support.

Thus, the MN is attached to the mobile network and assigned with HNPs and LNPs. With reference to an illustrative representation 400b of the mobile network in FIG. 4B, MN-1 402 may attach to the mobile network via a base station 432 (or access point or AP). The (local or closest) UP anchor node that is selected for MN-1 402 is access gateway 2 (AG-2) 442. The HNP assigned to MN-1 402 is P1::/64.

Continuing with FIG. 3A, an IP traffic flow is established between the MN and a correspondent node (CN) along a first network path defined by a first plurality of nodes (step 310 of FIG. 3A). The IP traffic flow may be to and/or from a first HNP prefix allocated to the MN. The first network path for routing the IP traffic may be selected with use of a destination-based routing protocol. The destination-based routing protocol may be, for example, an Internet Group Management Protocol (IGMP), an Intermediate System to Intermediate System (IS-IS), an Open Shortest Path First (OSPF), or a Routing Information Protocol (RIP), to name but a few. The first plurality of nodes of the first network route include the first UP anchor node and an anchor node for the CN. The first UP anchor node of the MN-1 will be the service point for charging and accounting (and perhaps other services, such as lawful intercept) for the MN.

Figure 4B:
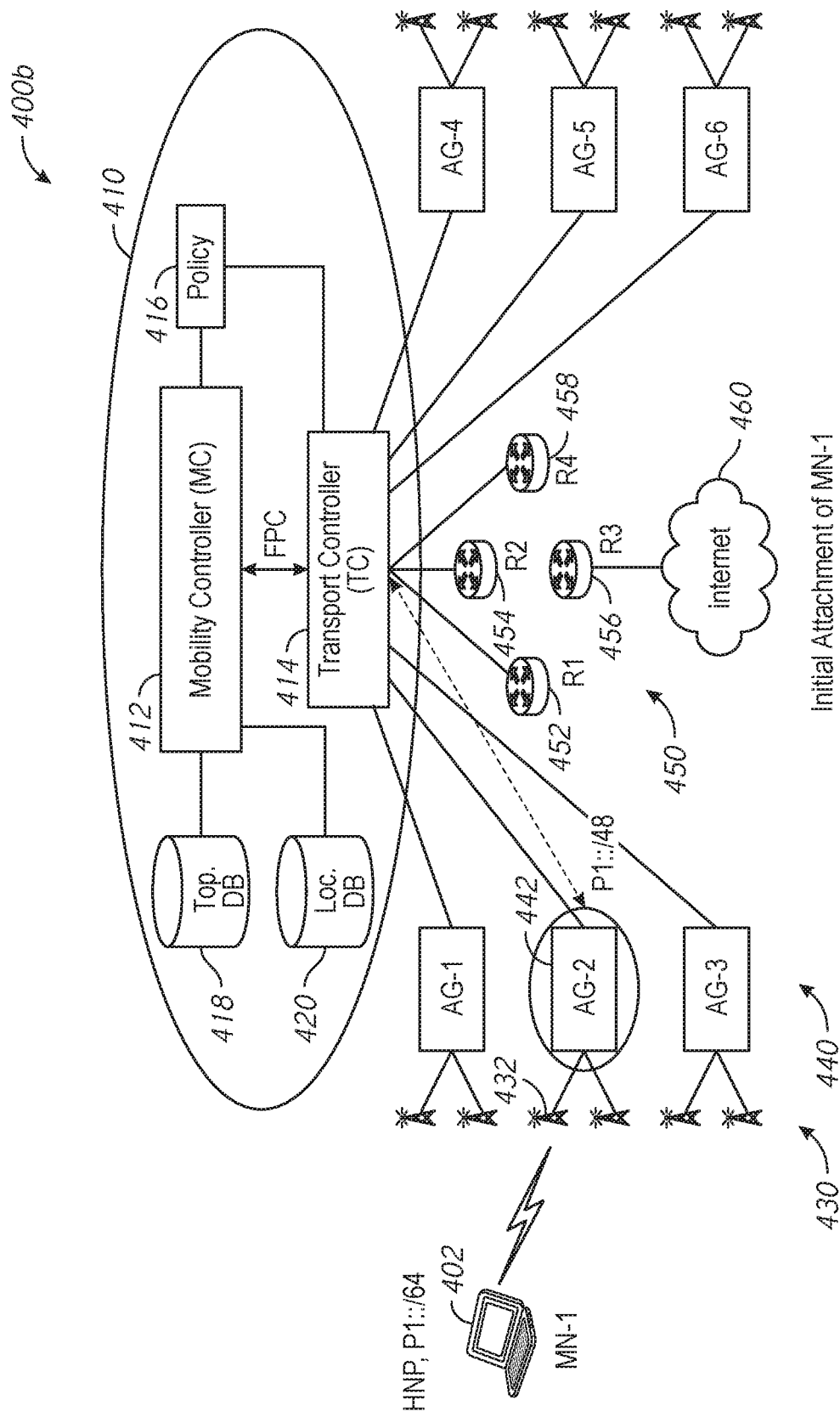

Thus, an IP traffic flow between the MN and the CN is established over a first network path through the mobile network, with use of the first HNP prefix of the MN. With reference to an illustrative representation 400c of the mobile network in FIG. 4C, a network path 480 for an IP traffic flow between MN-1 402 and a CN-1 404 (connected in the mobile network via a base station 434) is shown. The network path 480 includes a plurality of nodes AG-2 442, R2 454, and AG-4 444. AG-4 is the access gateway (anchor node) for CN-1 404. FIG. 4B further illustrates an additional IP traffic flow between MN-1 402 and a CN-2 406 (connected to the Internet 460) over another network path 490. R3 456 is the anchor node for CN-2 406. This other network path 490 includes a plurality of nodes AG-2 442 and R3 456.

R3 456 is the anchor node for CN-2 406 General information regarding the network paths is provided in a table 502 of FIG. 5A. In this configuration/routing, there is no special tunneling or special forwarding rules in place to steer IP traffic flows for the MN (i.e. there is no SRv6 steering rules in place for these IP traffic flows).

Figure 3B:
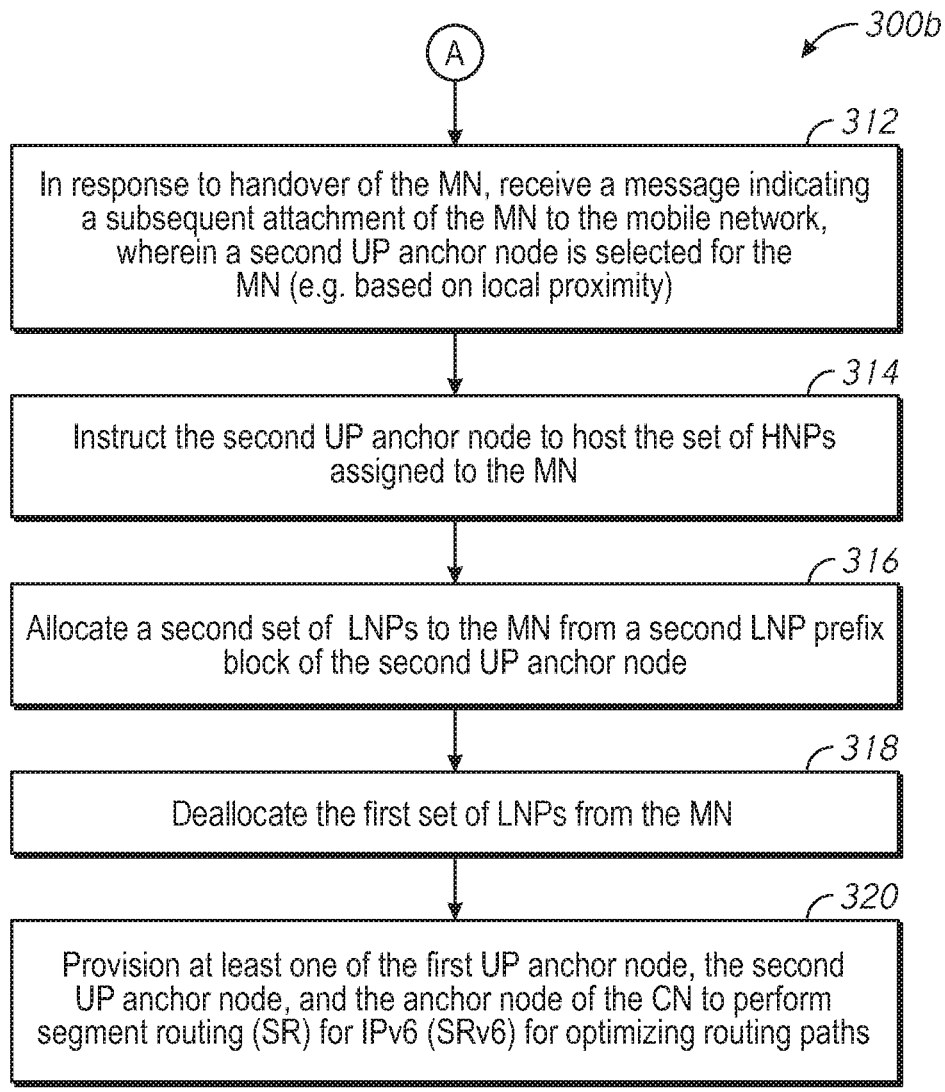

Continuing with a flowchart 300b in FIG. 3B via a connector A, in response to a handover of the MN, a message indicating a subsequent attachment of the MN to the mobile network is received, where a second UP anchor node is selected for the MN (step 312 of FIG. 3B). The second UP anchor node may be selected for the MN based on its local proximity to the MN (e.g. the closest UP anchor node). The second UP anchor node is instructed to host the set of HNPs previously assigned to the MN by the first anchor node (step 314 of FIG. 3B). Thus, the MN may continue to use the set of HNPs obtained from its initial attachment. In addition, a second set of LNPs are allocated to the MN from a second LNP prefix block of the second UP anchor node (step 316 of FIG. 3B). Note that the allocated set of LNPs are topologically anchored at the second UP anchor node. The first set of LNPs are deallocated from the MN (step 318 of FIG. 3B). The second UP anchor node of the MN-1 will be the service point for charging and accounting (and perhaps other services, such as lawful intercept) for the MN.

Thus, the MN is reattached to the mobile network and assigned with a new, second UP anchor node, maintaining its previous HNPs and having newly-assigned LNPs. With reference to an illustrative representation 400d of the mobile network in FIG. 4D, for the handover, MN-1 402 has reattached to the mobile network via a new base station 436 (or access point or AP). Here, the new (local) UP anchor node that is selected for MN-1 402 is an access gateway 6 (AG-6) 446, which will be the new service point for charging and accounting (and perhaps other services, such as lawful interept) for the MN. The HNPs of MN-1 402 are maintained as P1::/64 and the newly-assigned LNPs are P2::/64.

Continuing with FIG. 3B, sometime after the handover of the MN, at least one of the anchor nodes is provisioned to perform segment routing (SR) for IPv6 (SRv6), for rerouting and/or optimizing the network paths (step 320 of FIG. 3B). The rerouting and/or optimized network paths may be determined or selected based on IP traffic flow information (e.g. indicating unoptimized IP traffic flow) and network topology information which characterizes a network topology of the mobile network. The provisioned SRv6 routing may generally employ the SRv6 routing techniques described earlier in relation to FIGS. 1A-1D and elsewhere herein, using SRv6 network programming, for "steering" the IP traffic flows optimally as needed or desired.

Figure 3C:
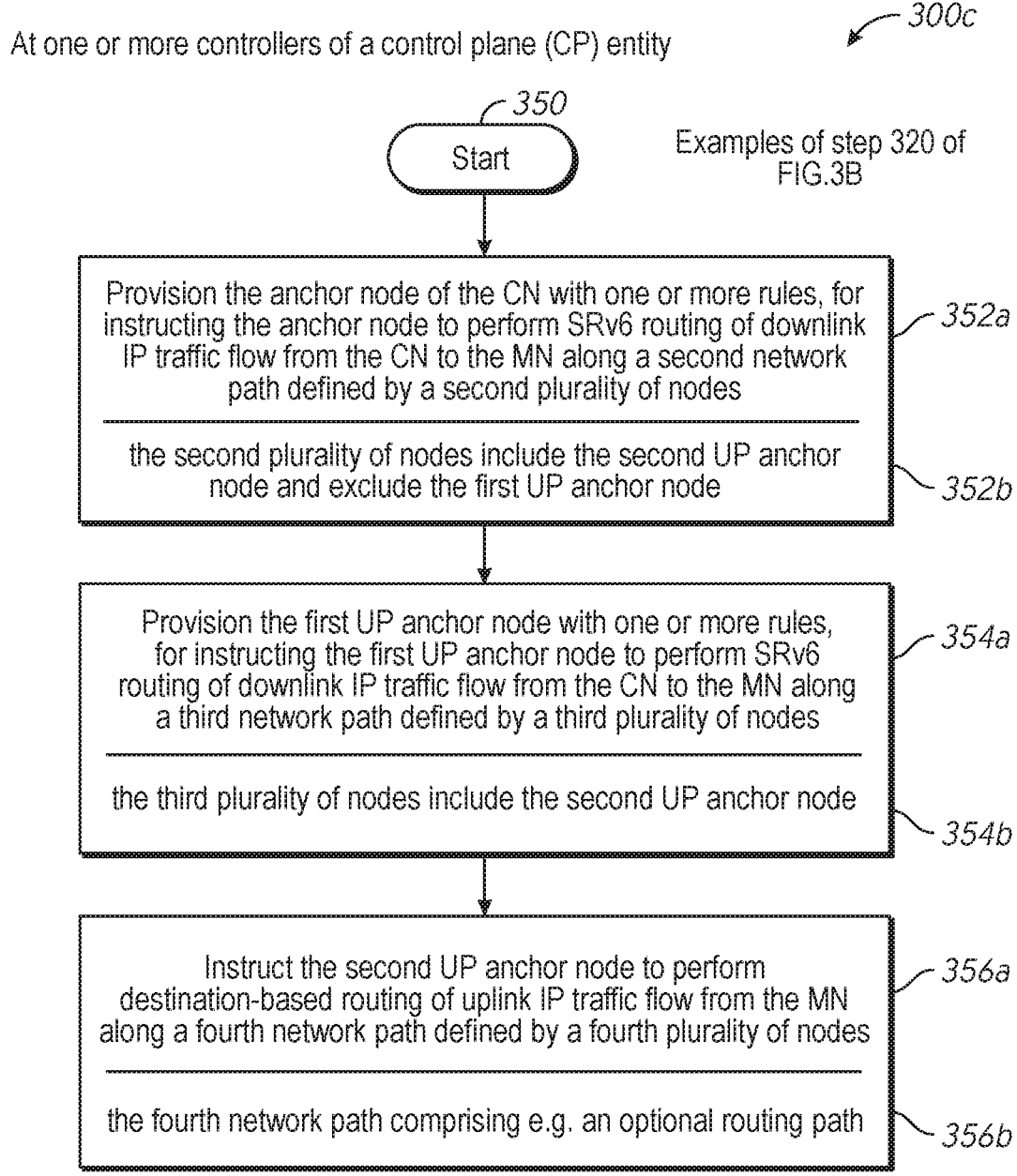

The provisioning of such policy rules in step 320 of FIG. 3C may be performed with use of any suitable protocol. For example, a suitable protocol for provisioning such rules may be a Forwarding Policy Configuration (FPC) protocol (see e.g. "Protocol for Forwarding Policy Configuration" as described in draft-ietf-dmm-fpc-cpdp-09.txt); a 3GPP GPRS Tunneling Protocol (GTP) Control Plane Protocol (GTP-C); an OpenFlow protocol (e.g. OpenFlow version 1.5.1); and Network Configuration Protocol (NETCONF) (e.g. described in RFC 4741) and YANG (e.g. RFC 6020).

Continuing with specific examples of step 320 provisioning in a flowchart 300c of FIG. 3C at a start block 350, sometime after the handover, the anchor node of the CN may be provisioned with one or more rules, for instructing the anchor node to perform SRv6 routing of downlink IP traffic flow from the CN to the MN along a second network path defined by a second plurality of nodes (step 352a of FIG. 3C). Here, the second plurality of nodes may include the second UP anchor node and exclude the first UP anchor node, in a more efficient path (step 352b of FIG. 3C).

As another example provided in FIG. 3C, sometime after the handover, the first UP anchor node may be provisioned with one or more rules, for instructing the first UP anchor node to perform SRv6 routing of downlink IP traffic flow from the CN to the MN along a third network path defined by a third plurality of nodes (step 354a of FIG. 3C). Here, the third plurality of nodes may include the second UP anchor node, in a more efficient path (step 354b of FIG. 3C).

As an alternative example provided in FIG. 3C, sometime after the handover, the second UP anchor node may be instructed or provisioned to perform a destination-based routing of uplink IP traffic flow from the MN, along a fourth network path defined by a fourth plurality of nodes (step 356a of FIG. 3C). Here, the fourth network path may be a more optimal routing path (step 356b of FIG. 3C), as provided by at least some destination-based routing protocols. In some implementations, the instructing of performing the destination-based routing may be an implicit instruction (e.g. an implicit instruction to perform destination-based routing when no other overriding SRv6 rule is provisioned or provided).

Thus, the provisioning of SRv6 routing rules at the anchor nodes may be used to "steer" IP traffic flows as needed or desired. At least some SRv6 functions which may be used or activated for these purposes are provided in a table 504 of FIG. 5B. As shown, an SRv6 function which may be used or activated may depend on the anchor node and the direction of the IP traffic flow. As shown, an SRv6 function may be or include a "T.Insert" function or an "End.X" function. Note that the type of functions may change and depend on the type of access architecture. With use of such functions, network paths for IP traffic flows between a newly-located MN and the CN may be reconfigured for more optimal routing.

Figure 4C:
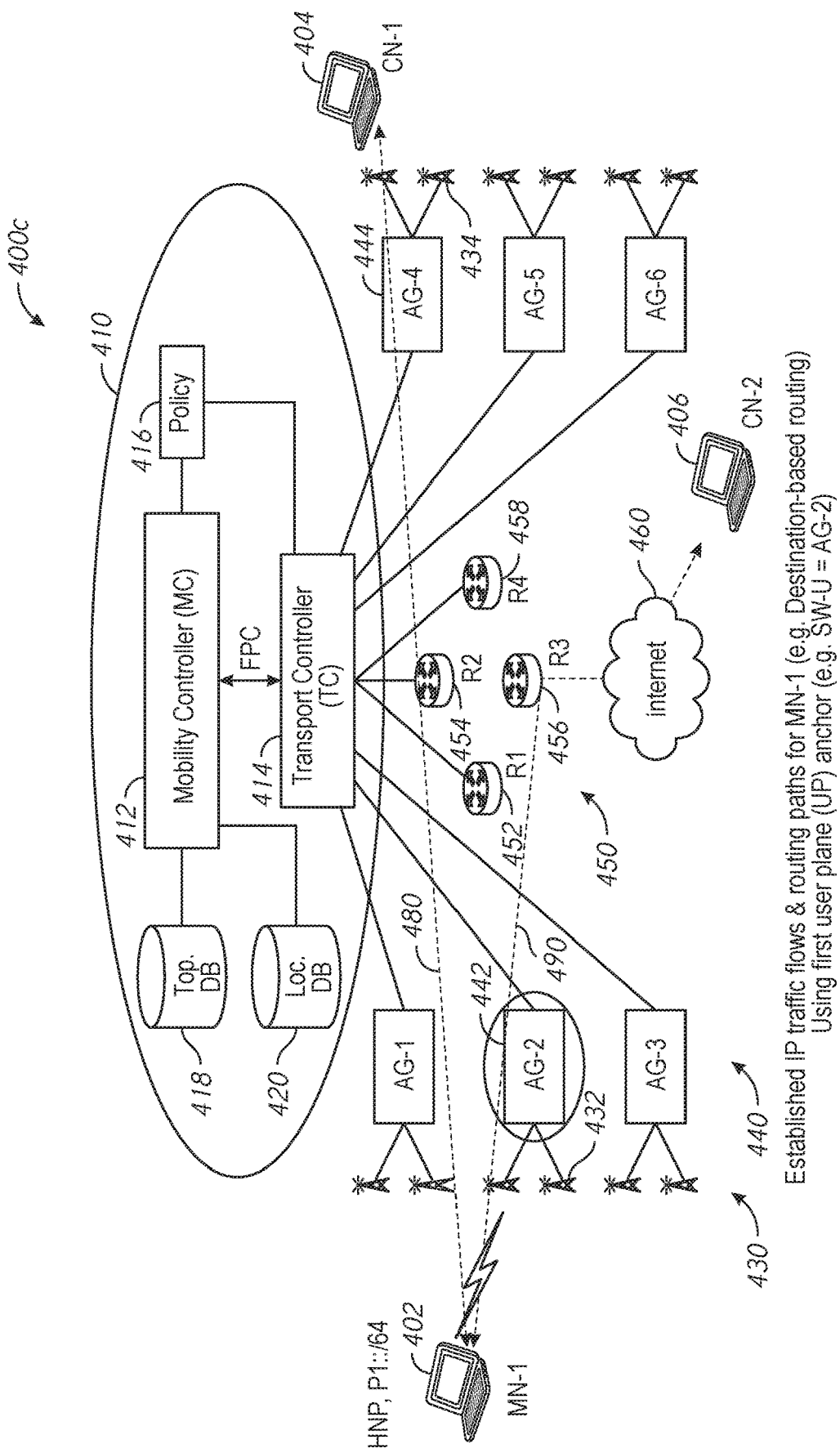
Figure 4D:
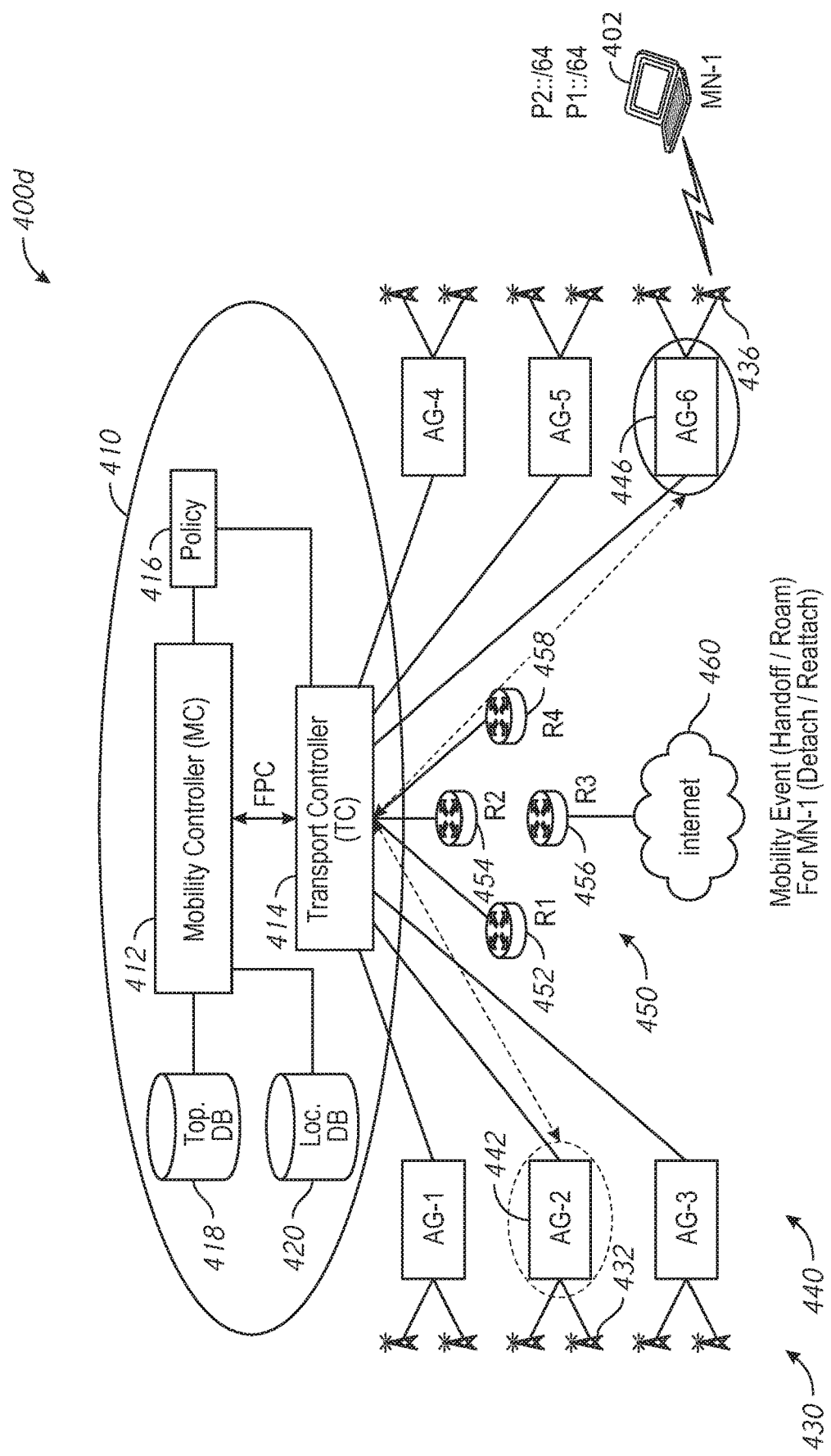
Figure 4E:
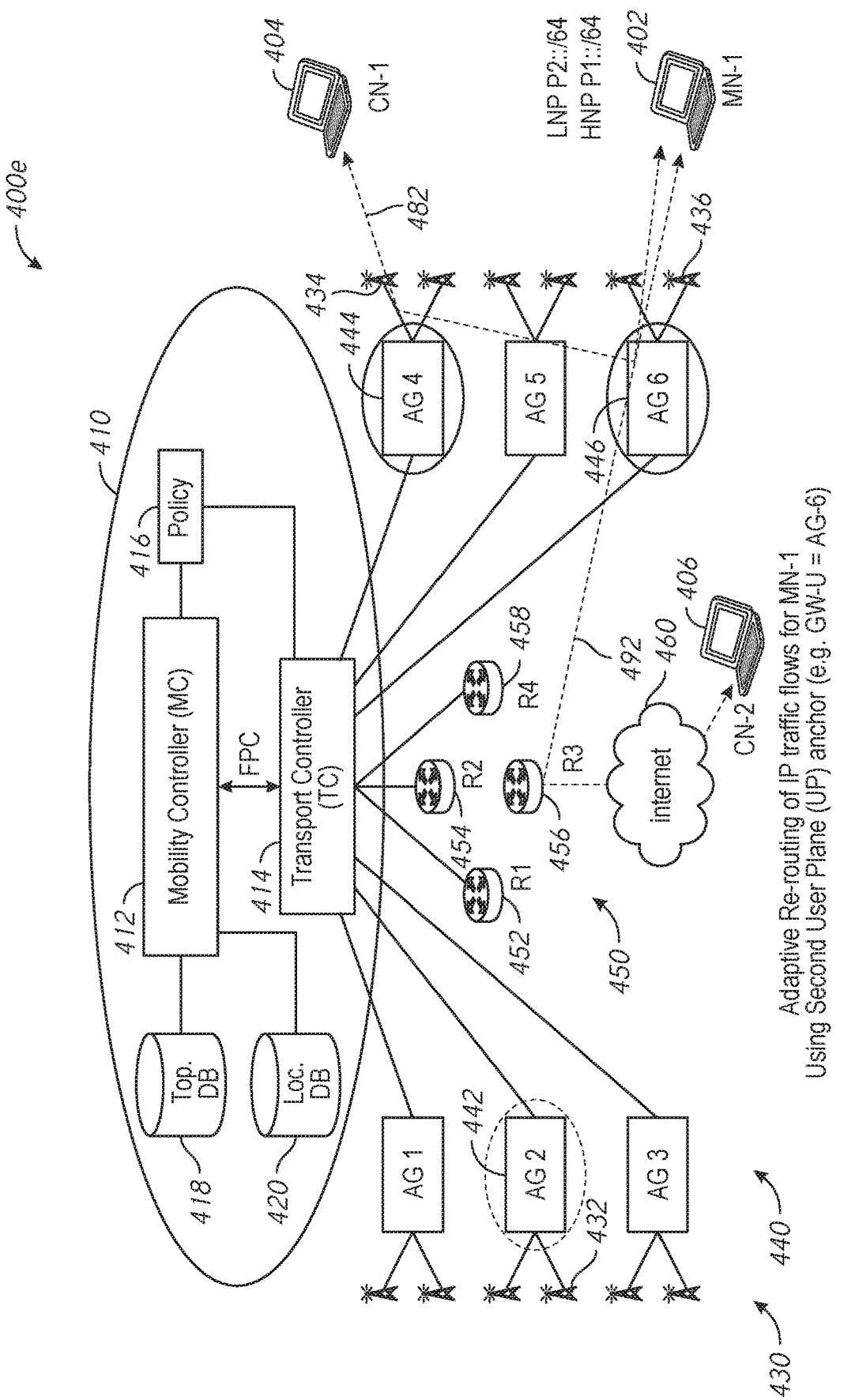

With reference to an illustrative representation 400e of the mobile network in FIG. 4E, a new network path 482 for IP traffic flows between MN-1 402 and CN-1 404 is illustrated. New network path 482 includes AG-6 446 and AG-4 444 and excludes AG-2 442. In addition, a new network path 492 for IP traffic flows between MN-1 402 and CN-2 406 is illustrated. New network path 492 includes AG-6 446 and R3 456 and excludes AG-2 442. General information regarding the updated network paths is provided in a table 506 of FIG. 5C.

Note that, sometime at the new second UP anchor node, a second set of HNPs may be allocated to the MN, where new network paths for newly-established IP traffic flows to and/or from a second HNP prefix of the MN may be selected based on the destination-based routing protocol, where the first HNP prefixes may (sometime later) be deallocated.

More details regarding the provisioning and reconfiguration in relation to the example of FIGS. 4C-4E will be described later in relation to the call flows of FIGS. 6A-6B, 7A-7B, and 8A-8B.

Figure 3D:
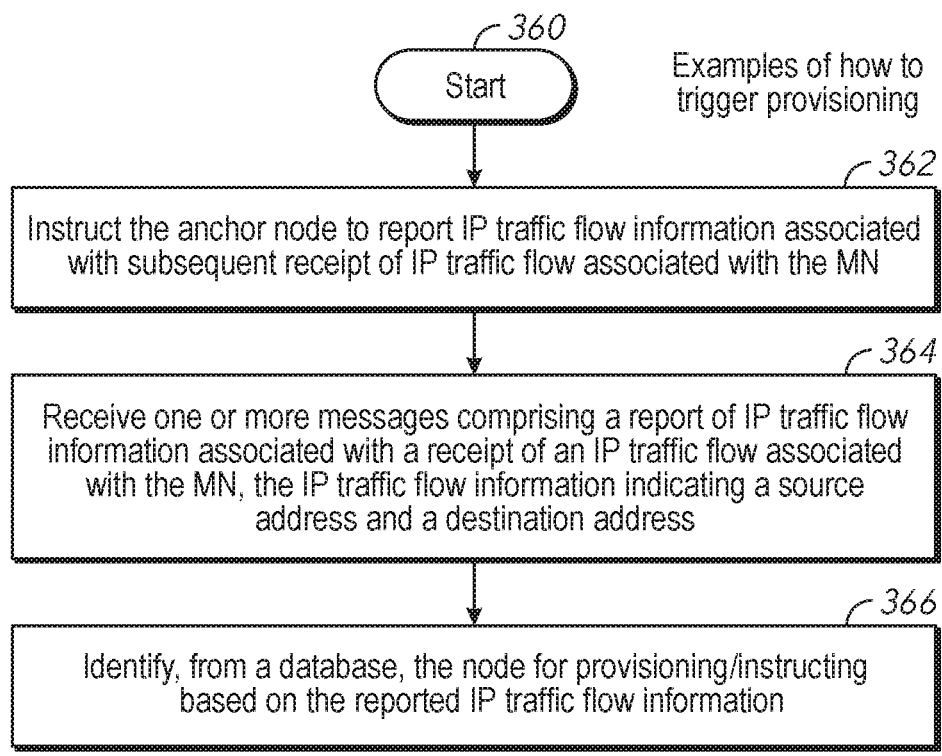

The provisioning of anchor nodes for rerouting may be performed at any suitable time or based on any suitable triggering mechanism. At least some of such provisioning may be performed in response to anchor node reports of IP traffic flow to and/or from the assigned first HNP prefix. FIG. 3D is a flowchart 300d for describing a method for use in triggering the provisioning of rules. Beginning at a start block 360 of FIG. 3D, in response to receiving the message indicating a subsequent attachment of the MN (e.g. as described earlier in step 312 of FIG. 3B) or an MN handover, an anchor node may be provisioned or instructed to report IP traffic flow information associated with subsequent receipt of (e.g. unoptimized) IP traffic flow associated with the MN (step 362 of FIG. 3D). Subsequently, one or more messages comprising a report of IP traffic flow information associated with a receipt of an (e.g. unoptimized) IP traffic flow may be received from the anchor node (step 364 of FIG. 3D). The reported IP traffic flow information may indicate a source address and a destination address of the IP traffic flow. An appropriate anchor node for provisioning/instructing may then be identified, from a mobile node location table, based on the reported IP traffic flow information (e.g. a source or destination address) (step 366 of FIG. 3D). The mobile node location table may provide stored associations between MNs and their assigned anchor nodes. After step 366, provisioning at the appropriately-identified node for SRv6 routing may then be performed as described, for example, in relation to the flowchart 300c of FIG. 3C.

More details related to the example of FIGS. 4C-4E are now described in relation to the call flows of FIGS. 6A-6B, 7A-7B, and 8A-8B.

Figure 6A:
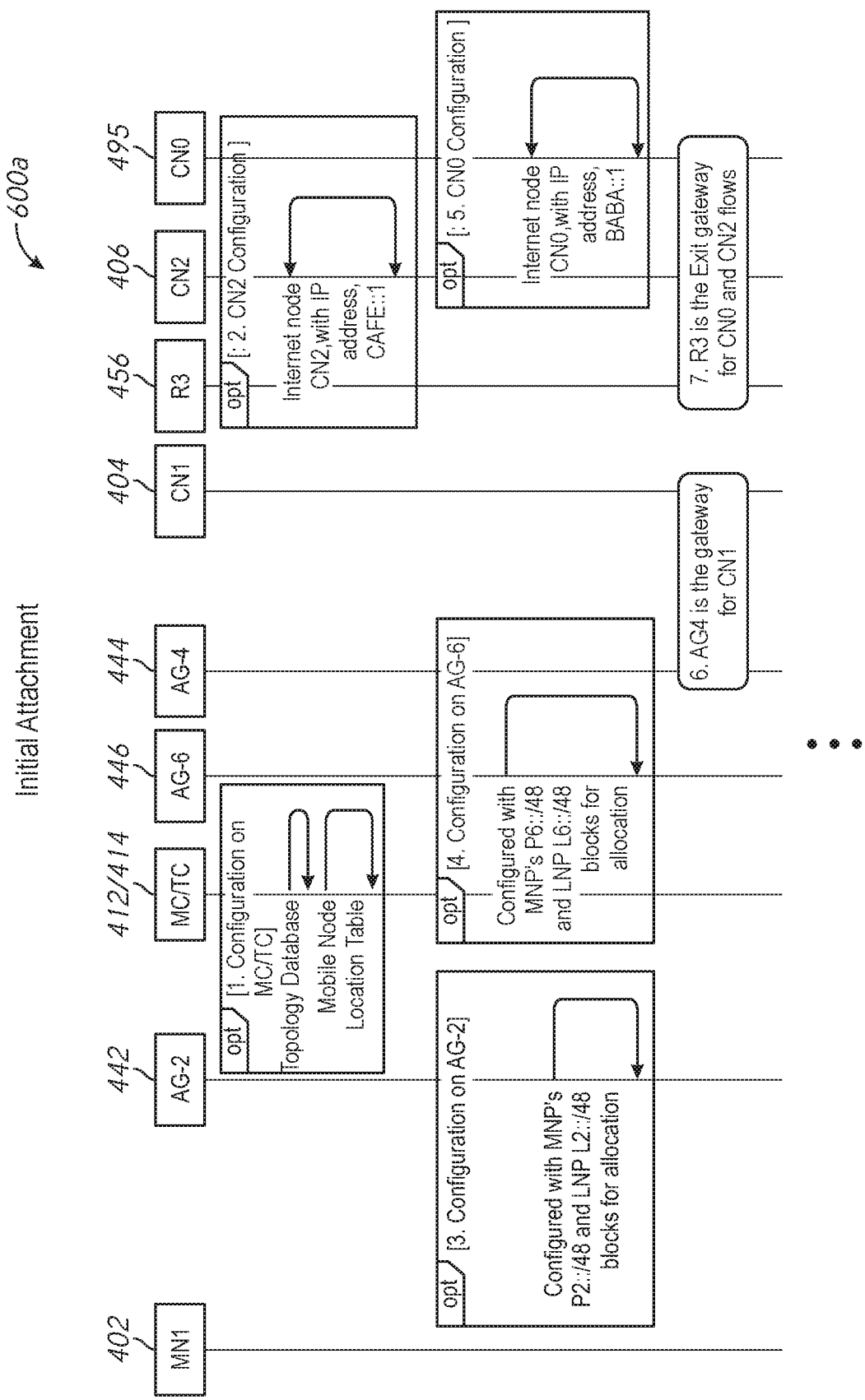
FIGS. 6A-6B are call flows for describing a more detailed technique for the adaptive rerouting of user plane traffic for the MN of FIGS. 4A-4E, more specifically relating to an initial attachment of the MN to the mobile network and the establishment of IP traffic flows associated with the MN.

Referring now to FIG. 6A, a call flow 600a is provided to describe the initial configuration of nodes in the mobile network. The network topology DB and the mobile node location table is configured in the MC 412/TC 414 (step 1 of FIG. 6A). CN-2 406 is configured with an IP address of CAFÉ::1 (step 2 of FIG. 6A). AG-2 442 is configured with HNPs P2::/48 and LNPs L2::/48 prefix blocks for allocation to MNs (step 3 of FIG. 6A). AG-6 446 is configured with HNPs P6::/48 and LNPs L6::/48 for allocation to MNs (step 4 of FIG. 6A). CN-0 is configured with an IP address of BABA::1 (step 5 of FIG. 6A). AG-4 444 is selected as the gateway (anchor) for CN-1 404 (step 6 of FIG. 6A). R3 456 is selected as the exit gateway (anchor) for IP traffic flows for CN-0 495 and CN-2 406 (step 7 of FIG. 6A).

Figure 6B:
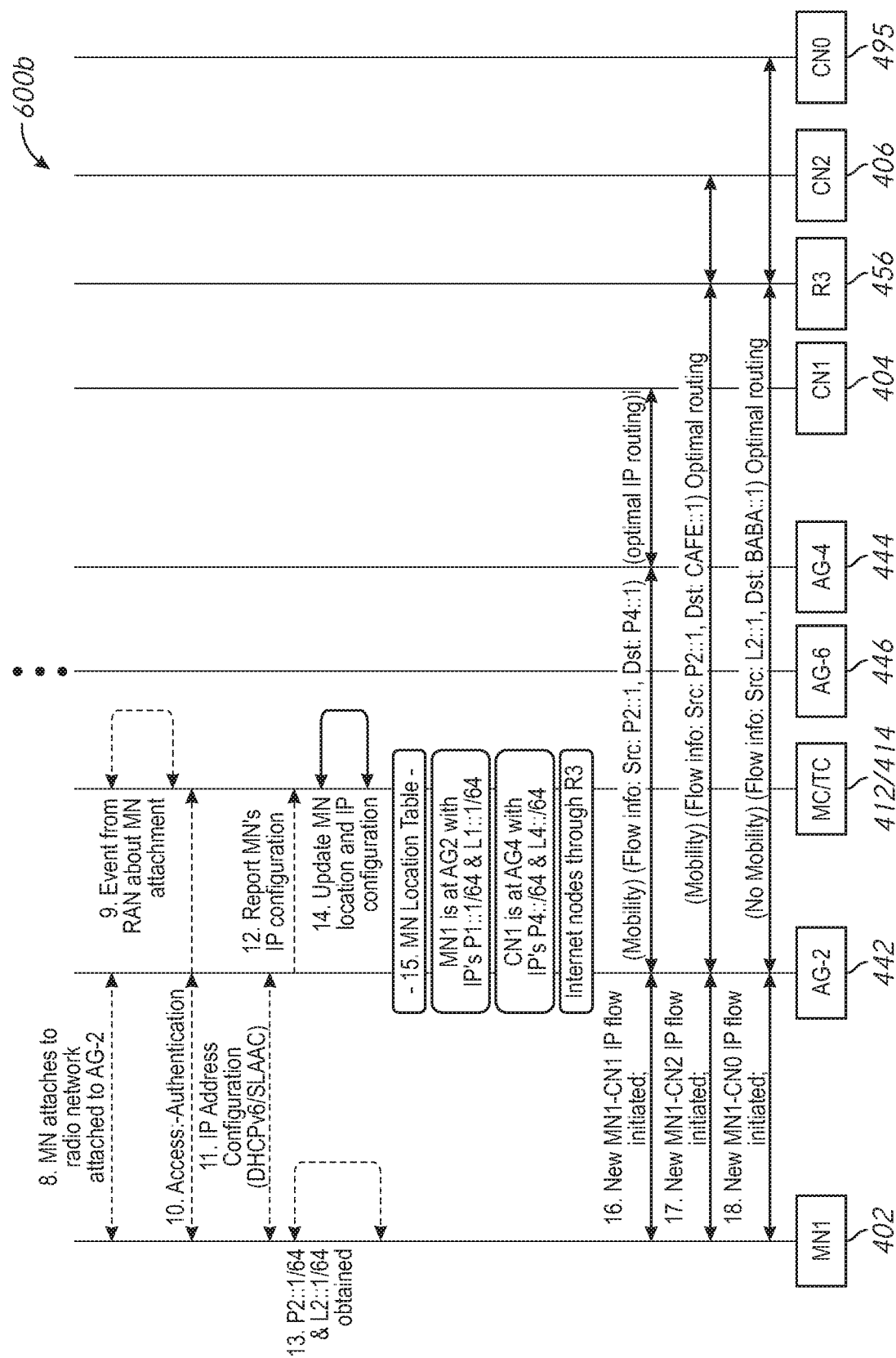

Continuing the description in FIG. 6B in a continued call flow 600b, an initial attachment of the MN-1 402 to the mobile network and the initial establishment of IP traffic flows associated with MN-1 402 are described. MN-1 402 attaches to the mobile network, where AG-2 442 is selected as the anchor (step 8 of FIG. 6B). MC 412/TC 414 receives a message indicating that MN-1 402 is attached to AG-2 442 (step 9 of FIG. 6B). MC 412/TC 414 performs access and authentication procedures with MN-1 402 (step 10 of FIG. 6B).

After successful authentication, an IP address configuration procedure is performed (e.g. DHCPv6/SLAAC) with AG-2 442 and MN-1 402 (step 11 of FIG. 6B). AG-2 442 reports this IP configuration of MN-1 402 to MC 412/TC 414 (step 12 of FIG. 6B). MN-1 402 obtains its allocated IP addresses, P2::1/64 and L2::1/64 (step 13 of FIG. 6B). MC 412/TC 414 updates the location and IP configuration of MN-1 402 in the mobile node location table (step 14 of FIG. 6B). More specifically (step 15 of FIG. 6B), the mobile node location table is updated to indicate MN-1 402 is at AG-2 442 with P1::1/64 and L1::1/64; CN-1 404 is at AG-4 444 with P1::1/64 and L1::1/64; and one or more nodes connected to the Internet are at R3 456.

Further as shown in FIG. 6B, IP traffic flows to and/or from MN-1 402 are established between nodes using destination-based routing protocols. More specifically, an IP traffic flow is established between MN-1 402 and CN-1 404 as indicated (step 16 of FIG. 6B). An IP traffic flow is established between MN-1 402 and CN-2 406 as indicated (step 17 of FIG. 6B). An IP traffic flow is also established between MN-1 402 and CN-0 495 as indicated (step 18 of FIG. 6B).

Figure 7A:
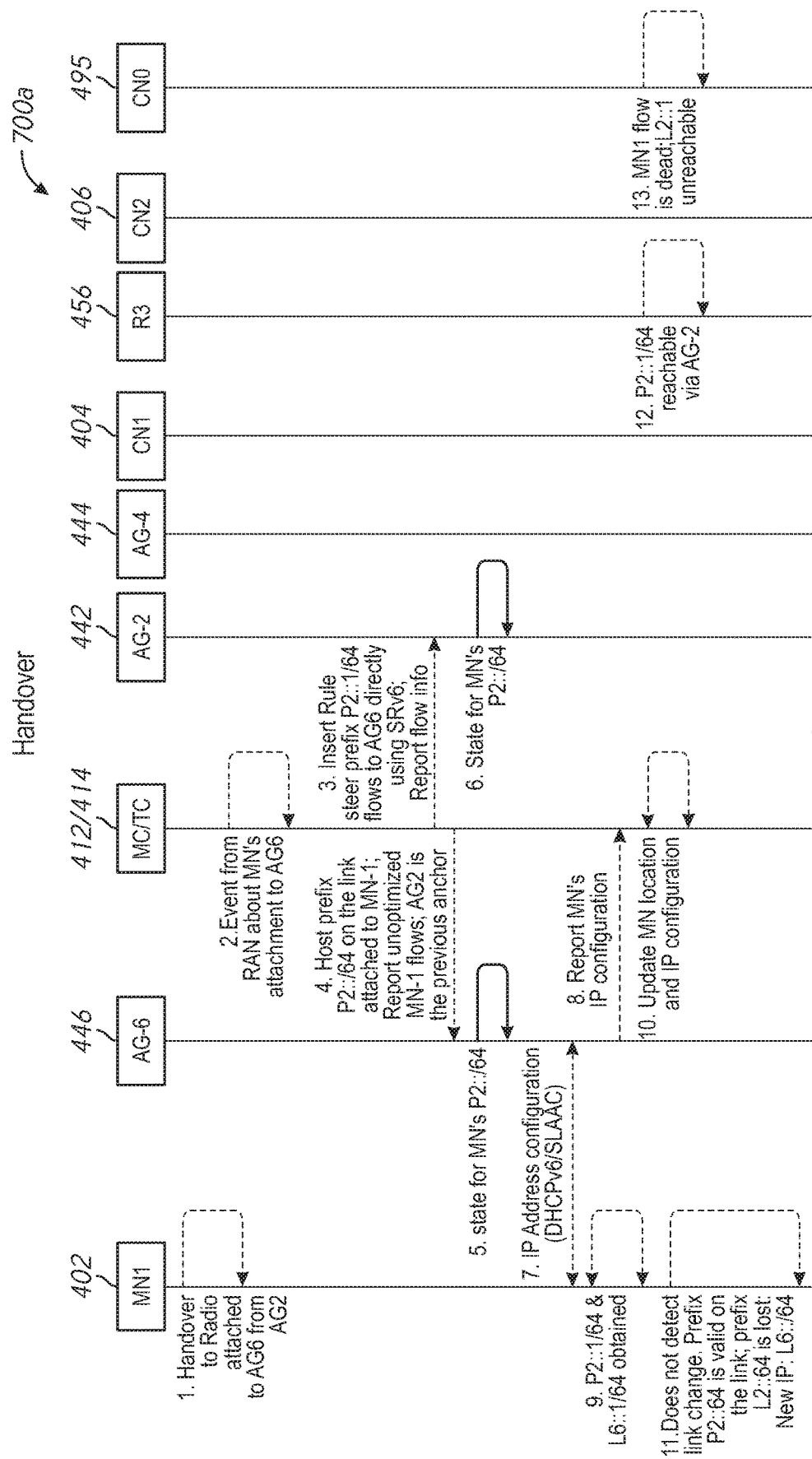
FIGS. 7A-7B are call flows for describing a more detailed technique for the adaptive rerouting of user plane traffic for the MN of FIGS. 4A-4E, more specifically relating to a handover of the MN and resulting network actions associated therewith (e.g. SRv6 optimized rerouting)

Referring now to FIG. 7A, a call flow 700a is provided to describe actions that are performed in response to a handover of MN-1 402 in the mobile network (e.g. provision or provide instructions to one or more anchor nodes to report IP traffic flows, provision or provide anchor nodes with SRv6 for more optimal routing, etc.). In FIG. 7A, a handover of MN-1 402 occurs in the mobile network, where MN-1 402 detaches and subsequently reattaches (step 1 of FIG. 7A). After the handover, the new anchor or access gateway that is selected for MN-1 402 is AG-6 446. The MC 412/TC 414 receives an event notification indicating that MN-1 402 is now attached to AG-6 446 (step 2 of FIG. 7A).

In response, MC 412/TC 414 provisions AG-2 442 (i.e. the previous anchor for MN-1 402) with a rule to reroute IP traffic flows for prefix P2::/64 to AG-6 446 directly using SRv6 (step 3 of FIG. 7A). In addition, MC 412/TC 414 provisions AG-2 442 (i.e. the previous anchor for MN-1 402) with a rule to report new IP traffic flows. Further, MC 412/TC 414 instructs AG-6 446 (i.e. the new anchor node for MN-1 402) to host prefix P2::/64 on the link attached to MN-1 402 (step 4 of FIG. 7A). In addition, MC 412/TC 414 provisions AG-6 446 (i.e. the new anchor for MN-1 402) with a rule to report unoptimized IP traffic flows associated with MN-1 402. State information for MN-1's P2::/64 is updated at AG-6 446 (step 5 of FIG. 7A) and at AG-2 442 (step 6 of FIG. 7A).

An IP address configuration procedure is performed (e.g. DHCPv6/SLAAC) with AG-6 446 and MN-1 402 (step 7 of FIG. 7A). AG-6 446 reports this IP configuration of MN-1 402 to MC 412/TC 414 (step 8 of FIG. 7A). MN-1 402 obtains its IP addresses, P2::1/64 and L6::1/64 (step 9 of FIG. 7A). MC 412/TC 414 updates the location and IP configuration of MN-1 402 in the mobile node location table (step 10 of FIG. 7A). Note that MN-1 402 does not detect the link change; prefix P2::64 remains valid on the link (step 11 of FIG. 7A). In addition, new L2::/64 is obtained, but previous L2::64 is lost. At R3 456, P2::1/64 is still reachable via AG-2 446 (step 12 of FIG. 7A). At a previous local CN-0 495, IP traffic flow for MN-1 402 is dead; previous local L2::1 is unreachable (step 13 of FIG. 7A).

Figure 7B:
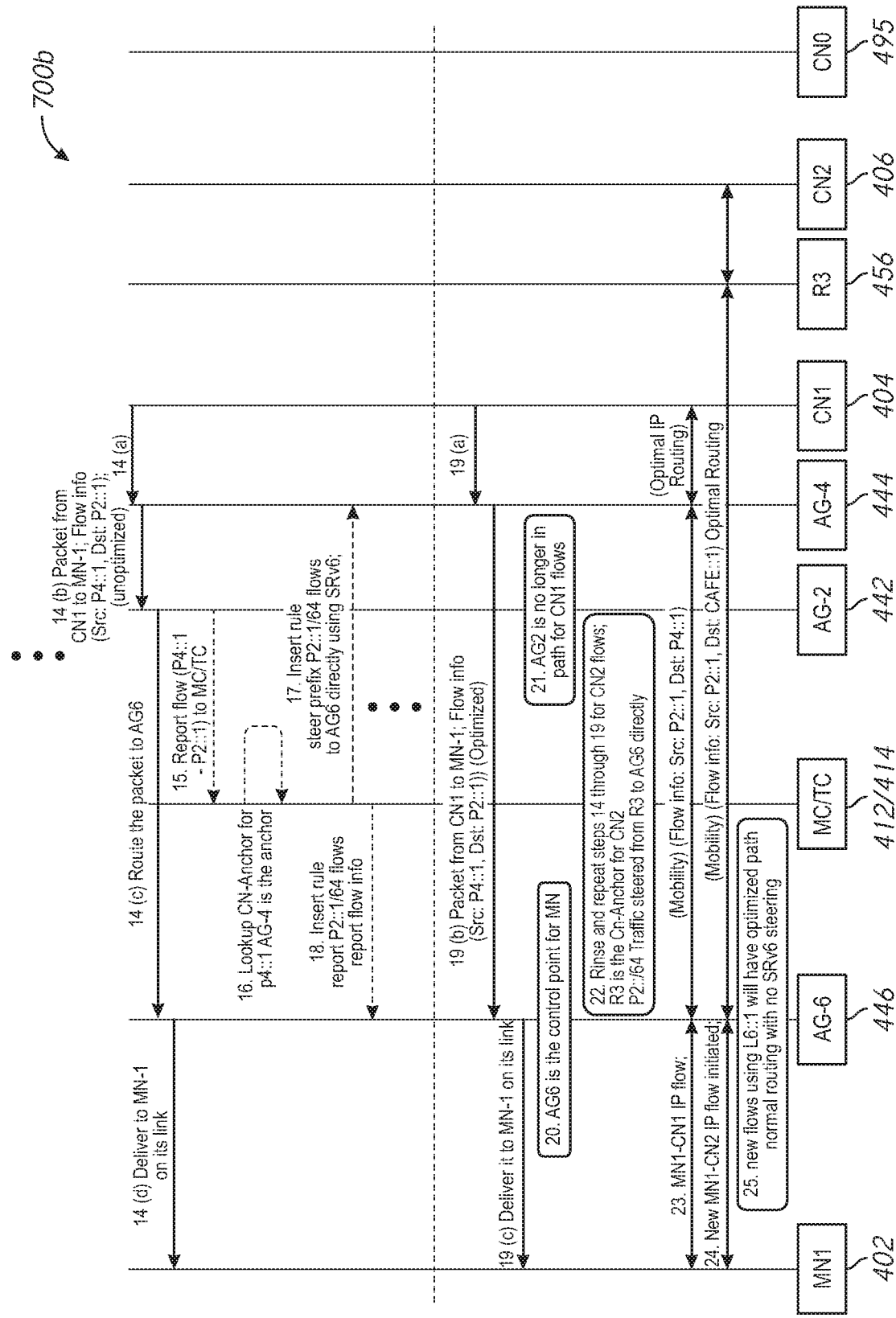

Continuing the description in FIG. 7B in a continued call flow 700b, an (unoptimized) IP traffic flow from CN-1 404 to MN-1 402 occurs as indicated in steps 14(a), 14(b), 14(c) and 14(d). In these steps, the network route of the IP traffic flow is CN-1 404→AG-4 444→AG-2 442→AG-6 446→MN-1 402. In response to receipt of the IP traffic flow, AG-2 442 reports IP traffic flow information of the IP traffic flow to MC 412/TC 414 (step 15 of FIG. 7B). The report includes the IP traffic flow between P4::1-P2::1. In response to receipt of the report, MC 412/TC 414 looks up the anchor node for CN-1 404 in the mobile node location table based on P4::1 and identifies the anchor node as AG-4 444 (step 16 of FIG. 7B). In response, MC 412/TC 414 provisions AG-4 444 with a rule to steer IP traffic flows for prefix P2::1/64 to AG-6 446 directly using SRv6 (step 17 of FIG. 7B). In addition, MC 412/TC 414 provisions AG-6 446 with a rule to report IP traffic flows for P2::1/64 (step 18 of FIG. 7B).

Subsequently, an additional IP traffic flow occurs from CN-1 404 to MN-1 402 as indicated in steps 19(a), 19(b), and 19(c). As provisioning for SRv6 optimization was provided in steps 18 and 19, however, this IP traffic flow is now optimized (e.g. the IP traffic flow no longer traverses AG-2 442). The network route of the IP traffic flow is CN-1 404→AG-4 444→AG-6 446→MN-1 402. AG-6 446 is the new service or control point for MN-1 402 (step 20 of FIG. 7B); AG-2 442 is no longer in the path for IP traffic flows of CN-1 404 (step 21 of FIG. 7B). Similar operation may be performed according to steps 14 through 19 for IP traffic flows associated with CN-2 406 (step 22 of FIG. 7B), where R3 456 is the initial anchor node for CN-2 406 but IP traffic flow for P2::/64 is steered from R3 456 to AG-6 446 directly. IP traffic flows between MN-1 402 and CN-1 404 are now more optimized as indicated (step 23 of FIG. 7B). IP traffic flows between MN-1 402 and CN-2 406 are also more optimized (step 24 of FIG. 7B). New IP traffic flows using L6::1 will have optimized network path, normal routing (e.g. destination-based routing) without SRv6 steering rules (step 25 of FIG. 7B).

Figure 8A:
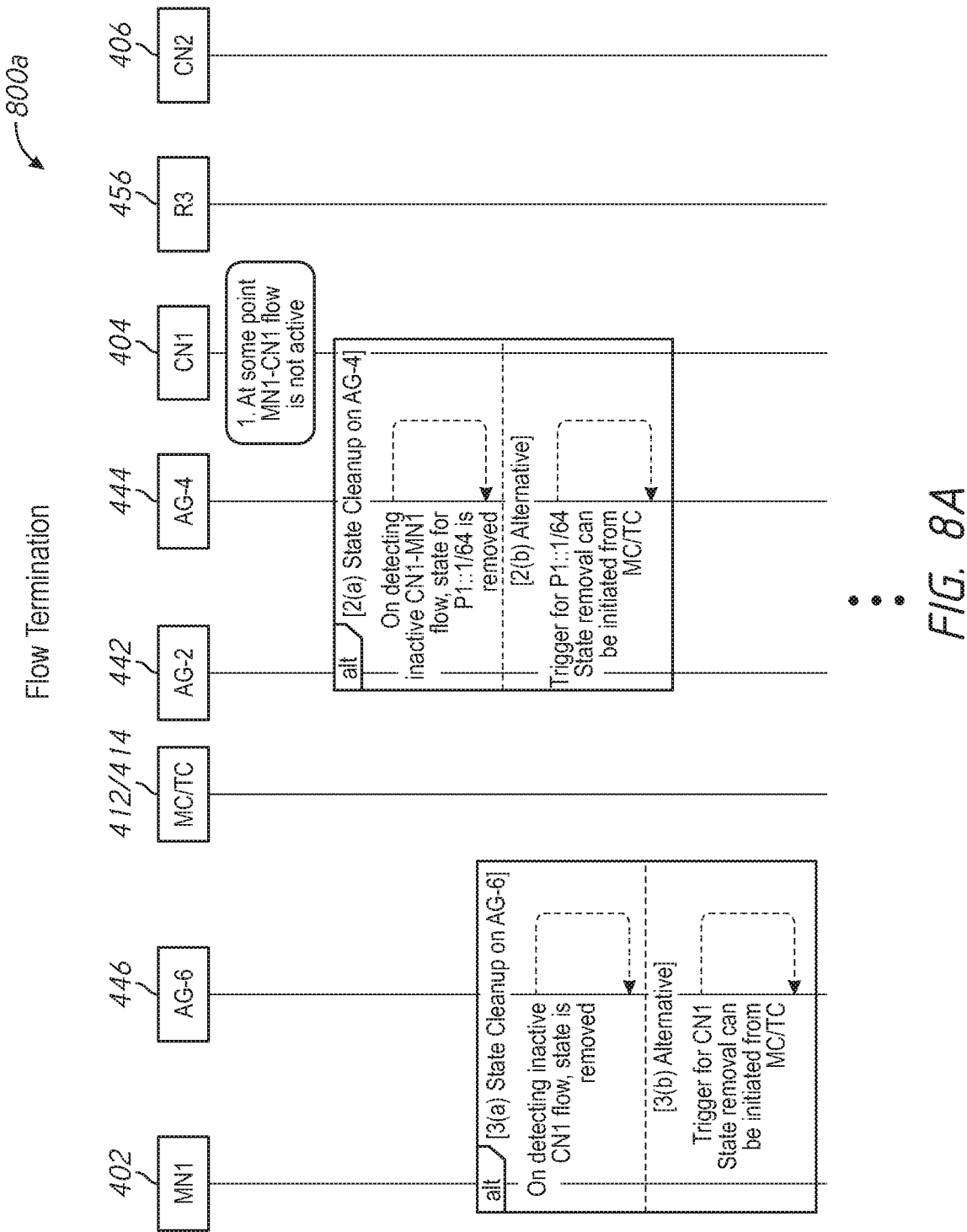
FIGS. 8A-8B are call flows for describing a more detailed technique for the adaptive rerouting of user plane traffic for the MN of FIGS. 4A-4E, more specifically relating to a termination of (inactive) IP traffic flows associated with the MN.

Referring now to FIG. 8A, a call flow 800a is provided to describe the termination of IP traffic flows associated with MN-1 402. At some point in time, IP traffic flow between MN-1 402 and CN-1 404 ceases, and this inactivity is detected (step 1 of FIG. 8A). In response, AG-4 444 "cleans up" or clears its state information for P2::1/64 which is removed (step 2(a) of FIG. 8A). As an alternative to step 2(a), MC 412/TC 414 may trigger the initiation of the removal of the state information (step 2(b) of FIG. 8A). Similarly, AG-6 446 "cleans up" or clears state information for CN-1 404 which is removed (step 3(a) of FIG. 8A). As an alternative to step 3(a), MC 412/TC 414 may trigger the initiation of the removal of the state information for CN_1 404 (step 3(b) of FIG. 8A).

Figure 8B:
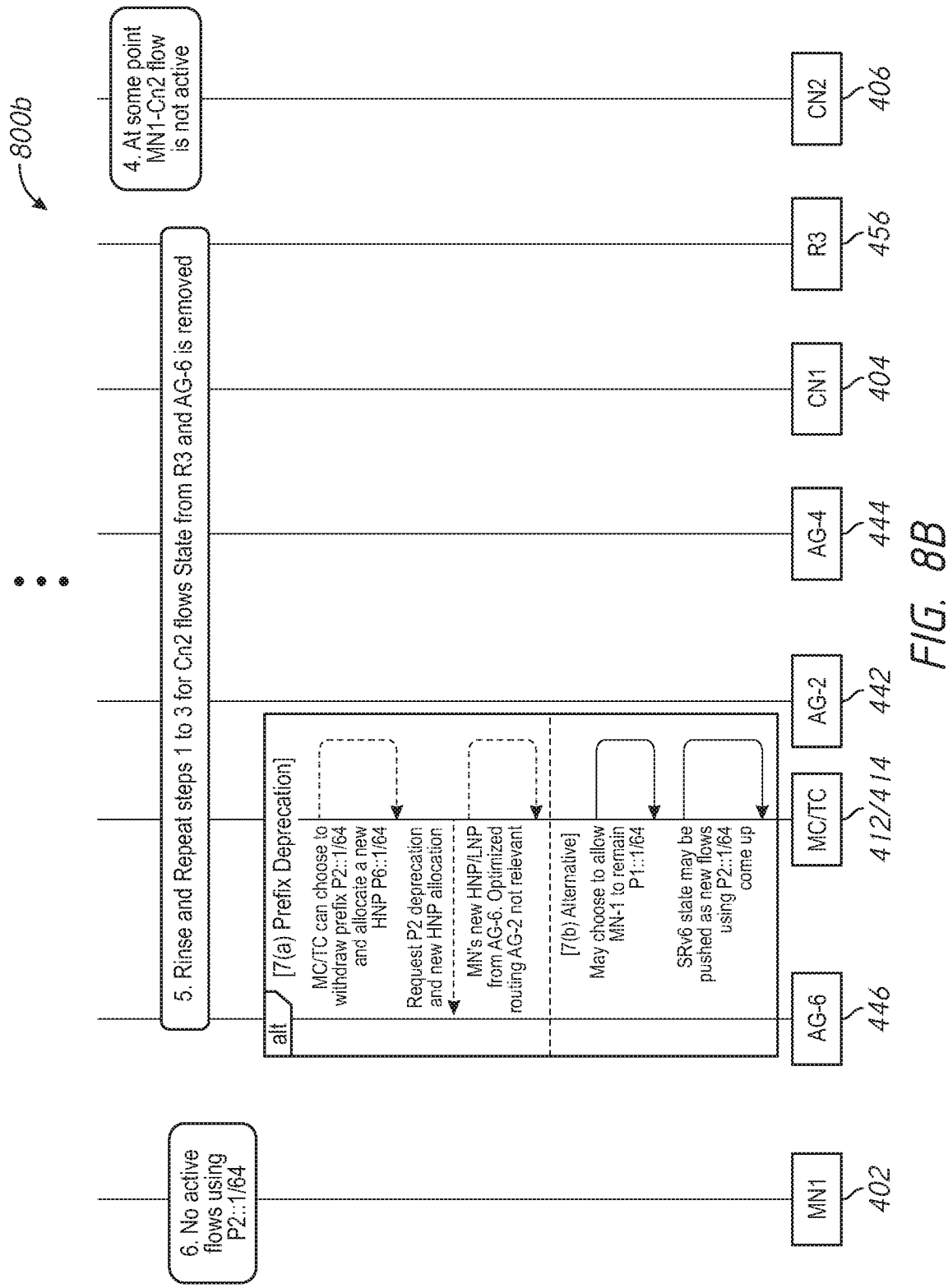

Continuing the description in FIG. 8B with the continued call flow 800b, at some point in time, IP traffic flow between MN-1 402 and CN-2 406 ceases, and this inactivity is detected (step 4 of FIG. 8B). In response, the same or similar steps as steps 2(a)/2(b) or 3(a)/3(b) of FIG. 8A may be performed (step 5 of FIG. 8B). Now, no active IP traffic flows exist for MN-1 402 using P2::1/64 (step 6 of FIG. 8B). In response to such inactivity, a prefix deprecation (and reallocation) procedure may be performed (step 7(a) of FIG. 8B). Here, MC 412/TC 414 requests P2 deprecation for withdrawing prefix P2::1/64, and also requests a new HNP allocation, P6::1/64. MN-402 will be allocated with new HNP and LNP from AG-6 446 (AG-2 442 is no longer relevant). As an alternative, MC 412/TC 414 may choose to allow MN-1 402 to retain P1::1/64, where SRv6 state is pushed as new IP traffic flows using P2::1/64 surface.

Figure 9:
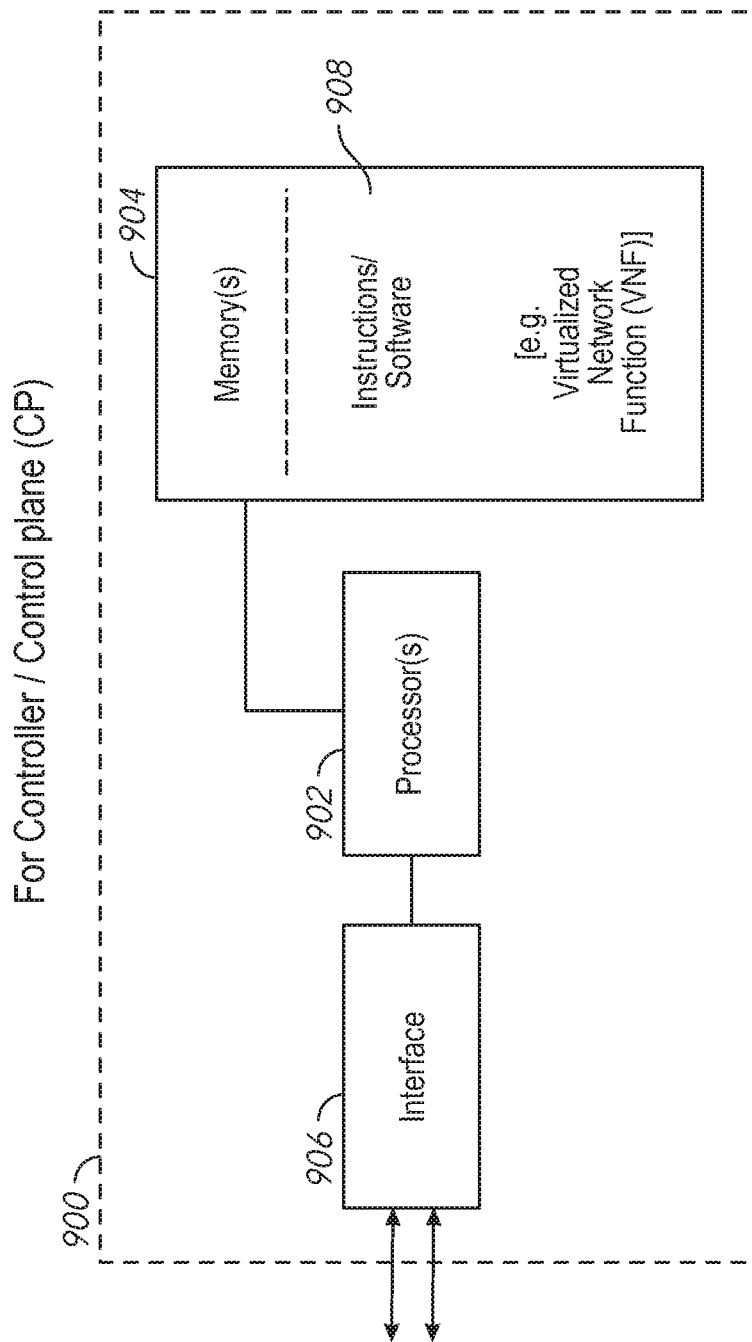
FIG. 9 a block diagram of pertinent components of a server, component, network device, or network equipment according to some implementations of the present disclosure.

Reference is now made to FIG. 9, which shows a block diagram of pertinent components of a server, component, or network device or network equipment 900 according to some implementations of the present disclosure (e.g. for one or more controllers of a control plane or CP entity, such as a mobility controller and/or transport controller). Network equipment 900 has components which may include one or more processors 902 which are coupled to memory 904 and to communication interface 906. Interface 906 is configured to connect to one or more networks for communications. The one or more processors 902 of the network device are configured to operate according to program instructions 908 stored in memory 904, in order to perform basic operations as well as to perform additional techniques of the present disclosure as described above in relation to the Figures.

Reference is now made to FIG. 10, which shows an example block diagram of a router device 1000 configured with the functions described herein according to some implementations of the present disclosure. Router device 1000 in FIG. 10 may alternatively be referred to as a router, or a switching device. It should be appreciated that router device 1000 may have a similar or the same basic components and functionality as any of the routers (e.g. gateways or access gateways) described herein.

Router device 1000 comprises, among other components, a plurality of port units 1002, a router application specific integrated circuit (ASIC) 1004, a processor 1006 and a memory 1008. Ports 1002 receive communications (e.g., frames) from network devices and are configured to send communications to network devices. For example, ports 1002 send messages destined for physical devices and receive response messages from physical devices. Ports 1002 are coupled to router ASIC 1004. Router ASIC 1004 receives instructions from processor 1006 and forwards frames and/or packets to an appropriate one of port units 1002 for transmission to a destination network device. Router ASIC 1004 is coupled to processor 1006. Processor 1006 is, for example, a microprocessor or microcontroller that is configured to execute program logic instructions (i.e., software) for carrying out various operations and tasks of a switch device, as described above. For example, processor 1006 is configured to execute software 1010 according to the techniques described above. The functions of processor 1006 may be implemented by logic encoded in one or more tangible computer readable storage media or devices (e.g., storage devices compact discs, digital video discs, flash memory drives, etc. and embedded logic such as an application specific integrated circuit, digital signal processor instructions, software that is executed by a processor, etc.).

Memory 1008 may comprise read only memory (ROM), random access memory (RAM), magnetic disk storage media devices, optical storage media devices, flash memory devices, electrical, optical, or other physical/tangible (non-transitory) memory storage devices. Memory 1008 stores software instructions for basic operation as well as for executing the techniques of the present disclosure. Memory 1008 may also store a route forwarding table 1012. Thus, in general, memory 1008 may comprise one or more computer readable storage media (e.g., a memory storage device) encoded with software comprising computer executable instructions and when the software is executed (e.g. by processor 1006) it is operable to perform the operations described for software 1010.

Software 1010 may take any of a variety of forms, so as to be encoded in one or more tangible computer readable memory media or storage device for execution, such as fixed logic or programmable logic (e.g., software/computer instructions executed by a processor), and processor 1006 may be an ASIC that comprises fixed digital logic, or a combination thereof. For example, processor 1006 may be embodied by digital logic gates in a fixed or programmable digital logic integrated circuit, which digital logic gates are configured to execute functions of software 1010. In general, the software 1010 may be embodied in one or more computer readable storage media encoded with software comprising computer executable instructions and when the software is executed operable to perform the operations described hereinafter.

Software 1010 may include a plurality of different software functions or modules, including one or more destination-based routing protocols 1050, an SRv6 routing protocol 1052, and one or more (e.g. control and/or programming, etc.) interfaces with the mobility controller (MC)/transport controller (TC) (see e.g. FIGS. 4A-4E). The one or more destination-based routing protocols 1050 may include one or more of Internet Group Management Protocol (IGMP), Intermediate System to Intermediate System (IS-IS), Open Shortest Path First (OSPF), Routing Information Protocol (RIP), or the like. If router device 1000 provides for providing user plane (UP) functionality for user plane traffic (e.g. an access gateway or GW-U), software 1010 may include one or more UP functions 1054. Accordingly, software 1010 is configured to support the techniques of the present disclosure described in relation to the figures above.

The techniques described above in connection with various implementations may be performed by one or more computer readable storage media that is encoded with software comprising computer executable instructions to perform the methods and steps described herein. For example, the operations performed by the routers and other physical devices may be performed by one or more computer or machine readable storage media (non-transitory) or device executed by a processor and comprising software, hardware or a combination of software and hardware to perform the techniques described herein.

Figure 11:
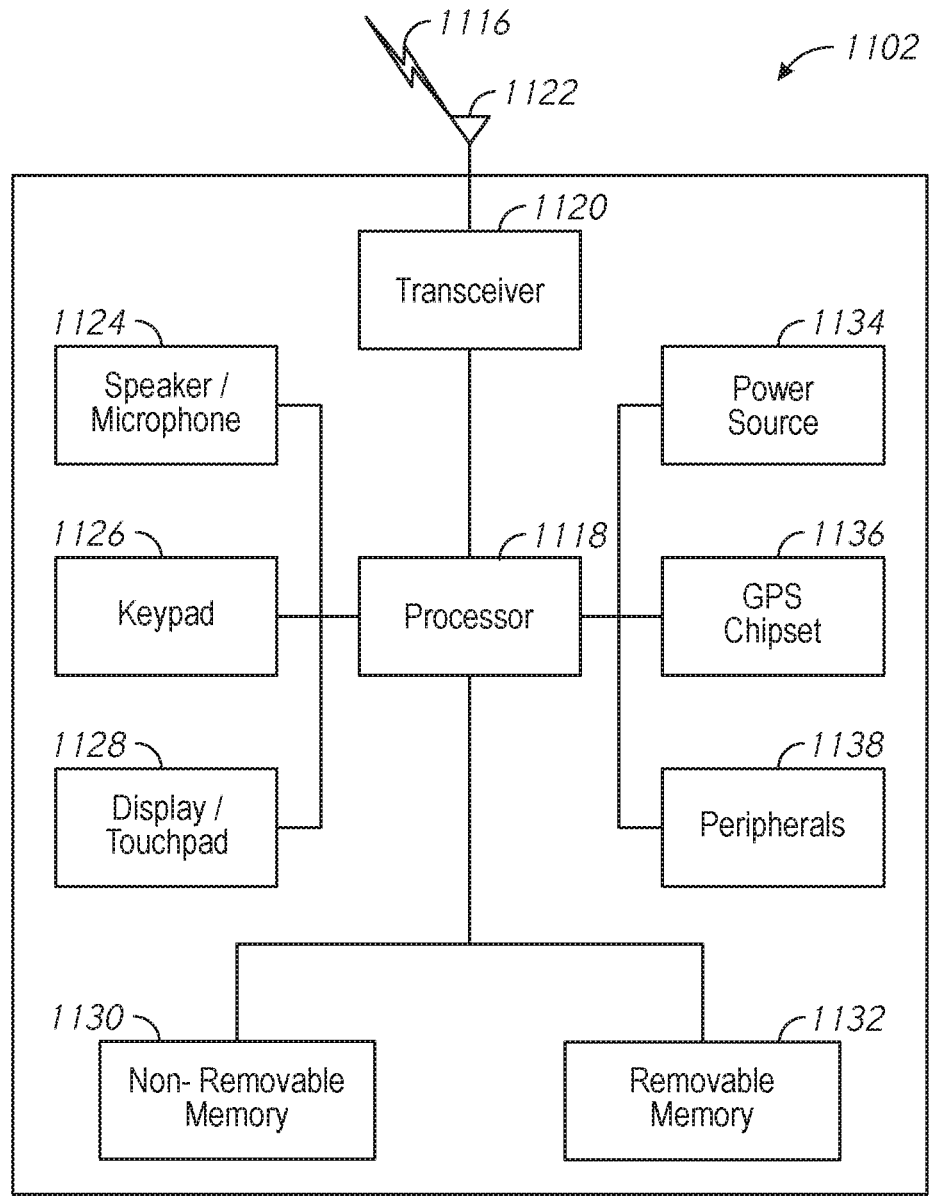
FIG. 11 shows an example schematic block diagram of a mobile node (MN) according to some implementations.

Reference is now made to FIG. 11, which shows an example schematic block diagram of a mobile node (MN) 1102 according to some implementations. MN 1102 may be, for example, a user equipment (UE), a cellular telephone, a smart phone, a tablet, a laptop computer, etc. As shown in FIG. 11, MN 1102 may include a processor 1118, a transceiver 1120, a transmit/receive element 1122, a speaker/microphone 1124, a keypad 1126, a display/touchpad 1128, non-removable memory 1106, removable memory 1132, a power source 1134, a global positioning system (GPS) chipset 1136, and other peripherals 1138. It will be appreciated that the MN 1102 may include any sub-combination of the foregoing elements while remaining consistent with an embodiment.

Processor 1118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. Processor 1118 may perform signal coding, data processing, power control, input/output processing, and/or any other functionality that enables MN 1102 to operate in a wireless environment. Processor 1118 may be coupled to transceiver 1120, which may be coupled to the transmit/receive element 1122. While FIG. 11 depicts the processor 1118 and the transceiver 1120 as separate components, it will be appreciated that the processor 1118 and the transceiver 1120 may be integrated together in an electronic package or chip.

Transmit/receive element 1122 may be configured to transmit signals to, or receive signals from, a base station over an air interface 1116. For example, in one embodiment, transmit/receive element 1122 may be an antenna configured to transmit and/or receive RF signals. In another embodiment, transmit/receive element 1122 may be an emitter/detector configured to transmit and/or receive IR, UV, or visible light signals, for example. In yet another embodiment, transmit/receive element 1122 may be configured to transmit and receive both RF and light signals. It will be appreciated that transmit/receive element 1122 may be configured to transmit and/or receive any combination of wireless signals.

In addition, although transmit/receive element 1122 is depicted in FIG. 11 as a single element, MN 1102 may include any number of transmit/receive elements 1122. More specifically, MN 1102 may employ MIMO technology. Thus, in one embodiment, MN 1102 may include two or more transmit/receive elements 1122 (e.g., multiple antennas) for transmitting and receiving wireless signals over air interface 1116.

Transceiver 1120 may be configured to modulate the signals that are to be transmitted by transmit/receive element 1122 and to demodulate the signals that are received by transmit/receive element 1122. As noted above, MN 1102 may have multi-mode capabilities. Thus, transceiver 1120 may include multiple transceivers for enabling MN 1102 to communicate via multiple RATs, such as UTRA and IEEE 802.11, for example.

Processor 1118 of MN 1102 may be coupled to, and may receive user input data from, speaker/microphone 1124, keypad 1126, and/or display/touchpad 1128 (e.g., a liquid crystal display (LCD) display unit or organic light-emitting diode (OLED) display unit). Processor 1118 may also output user data to speaker/microphone 1124, keypad 1126, and/or display/touchpad 1128. In addition, processor 1118 may access information from, and store data in, any type of suitable memory, such as non-removable memory 1106 and/or removable memory 1132. Non-removable memory 1106 may include random-access memory (RAM), read-only memory (ROM), a hard disk, or any other type of memory storage device. The removable memory 1132 may include a subscriber identity module (SIM) card, a memory stick, a secure digital (SD) memory card, and the like. In other embodiments, processor 1118 may access information from, and store data in, memory that is not physically located on MN 1102, such as on a server or a home computer (not shown).

Processor 1118 may receive power from power source 1134, and may be configured to distribute and/or control the power to the other components in the MN 1102. Power source 1134 may be any suitable device for powering MN 1102. For example, power source 1134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

Processor 1118 may also be coupled to GPS chipset 1136, which may be configured to provide location information (e.g., longitude and latitude) regarding the current location of MN 1102. In addition to, or in lieu of, the information from the GPS chipset 1136, MN 1102 may receive location information over air interface 1116 from a base station and/or determine its location based on the timing of the signals being received from two or more nearby base stations. It will be appreciated that MN 1102 may acquire location information by way of any suitable location-determination method while remaining consistent with an embodiment.

Processor 1118 may further be coupled to other peripherals 1138, which may include one or more software and/or hardware modules that provide additional features, functionality and/or wired or wireless connectivity. For example, peripherals 1138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Methods and apparatus for use in adaptively rerouting user plane traffic for mobility using a segment routing (SR) for IPv6 (SRv6) protocol have been described. Advantageously, a mobility-aware, floating anchor (MFA) may be provided in a mobile network. In some implementations, a technique of the present disclosure may be performed at one or more controllers of a control plane (CP) entity for a mobile network. In an illustrative example, a message indicating an attachment of a mobile node (MN) to the mobile network is received, where a first user plane (UP) anchor node (e.g. a GW-U) is selected for the MN. A first set of home network prefixes (HNPs) and a first set of local network prefixes (LNPs) are allocated to the MN. An IP traffic flow using a first HNP prefix of the MN is established between the MN and a correspondent node (CN) along a first network path. The first network path may be selected with use of a destination-based routing protocol, and defined by a first plurality of nodes which include the first UP anchor node of the MN and an anchor node of the CN.

In response to a handover of the MN in the mobile network, a message indicating a subsequent attachment of the MN to the mobile network is received, where a second UP anchor node is selected for the MN. The second UP anchor node is instructed to host the first HNP prefix previously allocated by the first UP anchor node. Further, at least one of the first UP anchor node, the second UP anchor node, and the anchor node of the CN may be provisioned with one or more rules, for instruction to perform SRv6 routing or rerouting of an IP traffic flow to and/or from the first HNP prefix of the relocated MN, to optimize such IP traffic flow. At least some of such provisioning may be performed in response to anchor node reports of IP traffic flow to and/or from the first HNP prefix.

As one example, the anchor node of the CN may be provisioned with one or more rules, for instructing the anchor node of the CN to perform SRv6 routing of a downlink IP traffic flow from the CN to the (relocated) MN along a second network path defined by a second plurality of nodes. The second plurality of nodes include the second UP anchor node and exclude the first UP anchor node, for optimizing the IP traffic flow.

At the new, second UP anchor node, a second set of HNPs and a second set of LNPs may allocated to the MN, where new network paths for newly-established IP traffic flows (for a second HNP prefix and/or for second LNP prefix) may again be selected based on the destination-based routing protocol.

In some implementations, in response to receiving the message indicating the subsequent attachment of the MN to the mobile network, the first UP anchor node may be provisioned or instructed to report IP traffic flow information associated with subsequent receipt of IP traffic flow associated with the MN. Subsequently, one or more messages may be received from the first UP anchor node, where the one or more messages comprise a report of downlink IP traffic flow information associated with a receipt of downlink IP traffic flow destined to the MN, where the downlink IP traffic flow information indicates a source address corresponding to the CN. The anchor node of the CN may be identified, from a mobile node location table, based on the downlink IP traffic flow information indicating the source address of the CN and network topology information which characterizes a network topology of the mobile network. The provisioning of the anchor node of the CN with the one or more rules may be performed in response to receiving the one or more messages comprising the report of the downlink IP traffic flow information.

In further implementations, after the handover, the first UP anchor node may be provisioned with one or more rules, for instructing the first UP anchor node to perform SRv6 routing of downlink IP traffic flow from the CN to the MN along a third network path defined by a third plurality of nodes. The third plurality of nodes includes the second UP anchor node of the MN. The third plurality of nodes of the third network path may be selected based on the network topology information.

In yet further implementations, in response to receiving the message indicating the subsequent attachment of the MN to the mobile network, the second UP anchor node may be instructed to report uplink IP traffic flow information associated with a subsequent receipt of uplink IP traffic flow from the MN. Subsequently, one or more messages may be received from the second UP anchor node, where the one or more messages may comprise a report of uplink IP traffic flow information associated with a receipt of uplink IP traffic flow from the MN. The after receiving the message indicating the subsequent attachment of the MN to the second UP anchor node, the second UP anchor node may be instructed to perform destination-based routing of uplink IP traffic flow from the MN.

In some implementations, a set of home network prefixes (HNPs) are assigned to the MN from a HNP prefix block of the first UP anchor node and, in response to receiving the message indicating the subsequent attachment of the MN to the mobile network, the second UP anchor node is instructed to host the set of HNPs allocated to the MN. In addition, a first set of local network prefixes (LNPs) are allocated to the MN from a first LNP prefix block of the first UP anchor node and, in response to receiving the message indicating the subsequent attachment of the MN to the mobile network, a second set of LNPs may be allocated to the MN from a second LNP prefix block of the second UP anchor node, and the first set of LNPs are deallocated. At the new, second UP anchor node, the second set of HNPs and the second set of LNPs allocated to the MN may be used, where new network paths for newly-established IP traffic flows (for a second HNP prefix and/or for second LNP prefix) may again be selected based on the destination-based routing protocol.

Note that the components and techniques shown and described in relation to the separate figures may indeed be provided as separate components and techniques; alternatively, one or more (or all of) the components and techniques shown and described in relation to the separate figures are provided together and/or used in combination for operation in a cooperative manner.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

For example, although the detailed embodiments above described the inventive techniques within the context of a 4G, LTE-based mobile network, where the one or more controllers of the CP entity were an MME and/or a GW-C and the first and the second UP anchor nodes were GW-Us which serve as service points for accounting and charging (and other services, such as lawful intercept), the inventive techniques may be applied in the same or similar manner to a 5G mobile network, where one or more controllers of the CP entity involve an access and mobility management function (AMF) and/or a session management function (SMF), and the first and the second UP anchor nodes may involve (instances of) user plane functions (UPFs) which serve as the service points for accounting and charging (and perhaps other services, such as lawful intercept).

It will also be understood that, although the terms "first," "second," etc. may be used herein to describe various elements, these elements should not be limited by these terms. These terms are only used to distinguish one element from another. For example, a first anchor node could be termed a second anchor node, and similarly, a second anchor node could be termed a first anchor node, without changing the meaning of the description, so long as all occurrences of the first anchor node are renamed consistently and all occurrences of the second anchor node are renamed consistently. The first anchor node and the second anchor node are both anchor nodes, but they are not the same anchor node.

The terminology used herein is for the purpose of describing particular embodiments only and is not intended to be limiting of the claims. As used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
   at one or more controllers of a control plane (CP) entity configured to control routing of user plane traffic with use of a segment routing (SR) for IPv6 (SRv6) protocol,
   receiving a message indicating an attachment of a mobile node (MN) to a mobile network, wherein a first user plane (UP) anchor node and a first set of home network prefixes (HNPs) are selected for the MN, and wherein an IP traffic flow to and/or from a first HNP prefix is established between the MN and a correspondent node (CN) along a first network path defined by a first plurality of nodes, the first plurality of nodes including the first UP anchor node of the MN and an anchor node of the CN;
   receiving a message indicating a subsequent attachment of the MN to the mobile network in response to a handover of the MN, wherein a second UP anchor node is selected for the MN;
   after receiving the message indicating the subsequent attachment of the MN to the mobile network:

instructing the second UP anchor node to host the first set of HNP prefixes previously allocated to the MN;

receiving from the first UP anchor node one or more messages comprising a report of downlink IP traffic flow information associated with receipt of downlink IP traffic from the CN destined to the first HNP prefix of the MN; and provisioning the anchor node of the CN with one or more rules for steering, to the second UP anchor node of the MN using SRv6 routing, IP traffic flows from the CN destined to the first HNP prefix of the MN, wherein the anchor node of the CN and the second UP anchor node of the MN are identified for the provisioning of the anchor node based on the report of the downlink IP traffic flow information.

2. The method of claim 1, further comprising:
at the one or more controllers of the CP entity,
in response to receiving the message indicating the subsequent attachment of the MN to the mobile network, provisioning the first UP anchor node with one or more rules for steering, to the second UP anchor node using SRv6 routing, downlink IP traffic flow destined to the first HNP prefix of the MN.

3. The method of claim 2, further comprising:
at the one or more controllers of the CP entity,
in response to receiving the message indicating the subsequent attachment of the MN, instructing the first UP anchor node to report IP traffic flow information associated with receipt of IP traffic destined to the first HNP prefix of the MN.

4. The method of claim 1, further comprising:
at the one or more controllers of the CP entity,
after the attachment of the MN to the mobile network, storing, in a mobile node location table, an identifier of the anchor node of the CN in association with an address of the CN; and
identifying, from the mobile node location table, the anchor node of the CN based on the downlink IP traffic flow information indicating a source address of the CN.

5. The method of claim 1, wherein the first network path is selected in accordance with a destination-based routing protocol.

6. The method of claim 1, wherein a second set of HNPs are allocated to the MN from the second UP anchor node, and wherein a new IP traffic flow to and/or from a second HNP prefix of the MN is established for the MN according to a destination-based protocol.

7. The method of claim 1, further comprising:
at the one or more controllers of the CP entity,
after receiving the message indicating the subsequent attachment of the MN to the second UP anchor node, instructing the second UP anchor node to perform destination-based routing of uplink IP traffic from the MN, by providing no overriding SRv6 rule for steering the uplink IP traffic.

8. The method of claim 7, further comprising:
at the one or more controllers of the CP entity,
in response to receiving the message indicating the subsequent attachment of the MN to the mobile network, instructing the second UP anchor node to report uplink IP traffic flow information associated with a subsequent receipt of uplink IP traffic flow from the MN;

receiving from the second UP anchor node one or more messages comprising a report of uplink IP traffic flow information associated with a receipt of uplink IP traffic flow from the MN; and wherein instructing the second UP anchor node to perform the destination-based routing is performed in response to receiving the one or more messages comprising the report of the uplink IP traffic flow information.

9. The method of claim 1,
wherein the provisioning of the anchor node of the CN with the one or more rules for steering further comprises using an SRv6 function for transit with insertion of an SRv6 policy.

10. The method of claim 9, further comprising:
wherein a first set of local network prefixes (LNPs) are allocated to the MN from a first LNP prefix block of the first UP anchor node; and
in response to receiving the message indicating the subsequent attachment of the MN to the mobile network, causing a second set of LNPs to be allocated to the MN from a second LNP prefix block of the second UP anchor node.

11. The method of claim 1, further comprising:
wherein the first network path is selected in accordance with a destination-based routing protocol;
wherein the one or more controllers of the CP entity comprise a transport controller; and
wherein the first and the second UP anchor nodes comprise access gateways.

12. The method of claim 1, further comprising:
wherein the one or more controllers of the CP entity comprise a mobility management entity (MME) and/or a gateway control plane (GW-C), and the first and the second UP anchor nodes comprise gateway user planes (GW-Us) which serve as service points for accounting and charging; or
wherein the one or more controllers of the CP entity comprise an access and mobility management function (AMF) and/or a session management function (SMF) and the first and the second UP anchor nodes comprise user plane functions (UPFs) which serve as service points for accounting and charging.

13. One or more controllers of a control plane (CP) entity for use in a mobile network, the one or more controllers of the CP entity comprising:
one or more processors;
memory coupled to the one or more processors;
the one or more processors being executable in accordance with instructions to adaptively reroute user plane traffic with use of a segment routing (SR) for IPv6 (SRv6) protocol, by:
receiving a message indicating an attachment of a mobile node (MN) to a mobile network, wherein a first user plane (UP) anchor node and a first set of home network prefixes (HNPs) are selected for the MN, and wherein an IP traffic flow to and/or from a first HNP prefix is established between the MN and a correspondent node (CN) along a first network path defined by a first plurality of nodes, the first plurality of nodes including the first UP anchor node of the MN and an anchor node of the CN;
receiving a message indicating a subsequent attachment of the MN to the mobile network in response to a handover of the MN, wherein a second UP anchor node is selected for the MN; and after receiving the message indicating the subsequent attachment of the MN to the mobile network:
instructing the second UP anchor node to host the first set of HNP prefixes previously allocated to the MN;
receiving from the first UP anchor node one or more messages comprising a report of downlink IP traffic flow information associated with receipt of downlink IP traffic from the CN destined to the first HNP prefix of the MN; and
provisioning the anchor node of the CN with one or more rules for steering, to the second UP anchor node of the MN using SRv6 routing, IP traffic flows from the CN destined to the first HNP prefix of the MN, wherein the anchor node of the CN and the second UP anchor node of the MN are identified for the provisioning of the anchor node based on the report of the downlink IP traffic flow information.

14. The one or more controllers of the CP entity of claim 13, wherein the one or more processors are further executable in accordance with the instructions for:
in response to receiving the message indicating the subsequent attachment of the MN to the mobile network, provisioning the first UP anchor node with one or more rules for steering, to the second UP anchor node using SRv6 routing, downlink IP traffic flow destined to the first HNP prefix of the MN.

15. The one or more controllers of the CP entity of claim 14, wherein the one or more processors are further executable in accordance with the instructions for:
in response to receiving the message indicating the subsequent attachment of the MN, instructing the first UP anchor node to report IP traffic flow information associated with receipt of IP traffic destined to the first HNP prefix of the MN.

16. The one or more controllers of the CP entity of claim 15, wherein the one or more processors are further executable in accordance with the instructions for:
after the attachment of the MN to the mobile network, storing, in a mobile node location table, an identifier of the anchor node of the CN in association with an address of the CN, and
identifying, from the mobile node location table, the anchor node of the CN based on the downlink IP traffic flow information indicating a source address of the CN.

17. The one or more controllers of the CP entity of claim 13, wherein the one or more processors are further executable in accordance with the instructions for:
after receiving the message indicating the subsequent attachment of the MN to the second UP anchor node, instructing the second UP anchor node to perform destination-based routing of uplink IP traffic from the MN, by providing no overriding SRv6 rule for steering the uplink IP traffic.

18. The one or more controllers of the CP entity of claim 15, wherein the one or more processors are further executable in accordance with the instructions for:
in response to receiving the message indicating the subsequent attachment of the MN to the mobile network, instructing the second UP anchor node to report uplink IP traffic flow information associated with a subsequent receipt of uplink IP traffic flow from the MN;
receiving from the second UP anchor node one or more messages comprising a report of uplink IP traffic flow information associated with a receipt of uplink IP traffic flow from the MN; and
instructing the second UP anchor node to perform destination-based routing of uplink IP traffic flow from the MN to the CN in response to receiving the one or more messages comprising the report of the uplink IP traffic flow information.

19. The one or more controllers of the CP entity of claim 13, further comprising:
wherein the one or more controllers of the CP entity comprise a mobility management entity (MME) and/or a gateway control plane (GW-C), and the first and the second UP anchor nodes comprise gateway user planes (GW-Us) which serve as service points for accounting and charging; or
wherein the one or more controllers of the CP entity comprise an access and mobility management function (AMF) and/or a session management function (SMF), and the first and the second UP anchor nodes comprise user plane functions (UPFs) which serve as service points for accounting and charging.

20. A computer program product, comprising:
a non-transitory computer readable medium;
program instructions stored on the non-transitory computer readable medium;
the program instructions being executed by one or more controllers of a control plane (CP) entity for adaptively rerouting user plane traffic with use of a segment routing (SR) for IPv6 (SRv6) protocol, by:
receiving a message indicating an attachment of a mobile node (MN) to a mobile network, wherein a first user plane (UP) anchor node and a first set of home network prefixes (HNPs) are selected for the MN, and wherein an IP traffic flow to and/or from a first HNP prefix is established between the MN and a correspondent node (CN) along a first network path defined by a first plurality of nodes, the first plurality of nodes including the first UP anchor node of the MN and an anchor node of the CN;
receiving a message indicating a subsequent attachment of the MN to the mobile network in response to a handover of the MN, wherein a second UP anchor node is selected for the MN; and
after receiving the message indicating the subsequent attachment of the MN to the mobile network:
instructing the second UP anchor node to host the first set of HNP prefixes previously allocated to the MN;
receiving from the first UP anchor node one or more messages comprising a report of downlink IP traffic flow information associated with receipt of downlink IP traffic from the CN destined to the first HNP prefix of the MN; and
provisioning the anchor node of the CN with one or more rules for steering, to the second UP anchor node of the MN using SRv6 routing, IP traffic flows from the CN destined to the first HNP prefix of the MN, wherein the anchor node of the CN and the second UP anchor node of the MN are identified for the provisioning of the anchor node based on the report of the downlink IP traffic flow information.

* * * * *